(12) United States Patent
 Zhang et al.

(10) Patent No.: US 11,740,500 B2
(45) Date of Patent: Aug. 29, 2023

(54) DRIVING METHOD AND DRIVING DEVICE OF DISPLAY PANEL, AND DISPLAY APPARATUS

(71) Applicant: BOE TECHNOLOGY GROUP CO., LTD., Beijing (CN)

(72) Inventors: Ping Zhang, Beijing (CN); Xiaoliang Ding, Beijing (CN); Changfeng Li, Beijing (CN); Yingzi Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,279

(22) PCT Filed: Jun. 17, 2021

(86) PCT No.: PCT/CN2021/100641
§ 371 (c)(1),
(2) Date: Apr. 27, 2022

(87) PCT Pub. No.: WO2022/022148
PCT Pub. Date: Feb. 3, 2022

(65) Prior Publication Data
US 2022/0382088 A1     Dec. 1, 2022

(30) Foreign Application Priority Data

Jul. 31, 2020  (CN) .......................... 202010756722.5

(51) Int. Cl.
*G02F 1/1333*    (2006.01)
*G06F 3/041*     (2006.01)
*G06V 40/13*     (2022.01)

(52) U.S. Cl.
CPC ........ *G02F 1/13338* (2013.01); *G06F 3/0412* (2013.01); *G06F 3/04166* (2019.05); *G06V 40/13* (2022.01)

(58) Field of Classification Search
None
See application file for complete search history.

(56) References Cited

U.S. PATENT DOCUMENTS

| 2011/0169793 | A1 | 7/2011 | Chen et al. |
| 2017/0371213 | A1* | 12/2017 | Wang ................ G02F 1/136277 |
| 2020/0159385 | A1 | 5/2020 | Chung et al. |

FOREIGN PATENT DOCUMENTS

| CN | 103163666 A | 6/2013 |
| CN | 105096790 A | 11/2015 |

(Continued)

OTHER PUBLICATIONS

China Patent Office, First Office Action dated Jun. 17, 2022 for application No. CN202010756722.5.

*Primary Examiner* — Nicholas J Lee
(74) *Attorney, Agent, or Firm* — HOUTTEMAN LAW LLC

(57) ABSTRACT

A driving method and a driving device of a display panel and a display apparatus are provided. The driving method includes: loading, within a fingerprint recognition phase (t), a plurality of operating signals to a plurality of operating signal leads (20) connected to a gate driving circuit (200), each operating signal (VGH_G) including first level signals and second level signals which are loaded alternately, and a time that the operating signal (VGH_G) switches between the first level signal and the second level signal being a switching time; and loading, within the fingerprint recognition phase (t), a plurality of fingerprint pulse signals to a plurality of fingerprint scanning leads (30), respectively, and for any fingerprint scanning lead (30), a time when the (Continued)

fingerprint scanning lead is loaded with a fingerprint pulse signal and is in an active level state does not overlap with the switching time.

20 Claims, 15 Drawing Sheets

(56) References Cited

FOREIGN PATENT DOCUMENTS

| | | |
|---|---|---|
| CN | 105139793 A | 12/2015 |
| CN | 207133838 U | 3/2018 |
| CN | 108776789 A | 11/2018 |
| CN | 208126362 U | 11/2018 |
| CN | 109685020 A | 4/2019 |
| CN | 109992154 A | 7/2019 |
| CN | 110088769 A | 8/2019 |
| CN | 110705411 A | 1/2020 |
| CN | 110765888 A | 2/2020 |
| CN | 110796124 A | 2/2020 |

* cited by examiner

S21 — Loading, within a fingerprint recognition phase, a plurality of operating signals to a plurality of operating signal leads, each operating signal including a plurality of first level signals and a plurality of second level signals that are loaded alternately, and a time that the operating signal switches between a first level signal and a second level signal being a switching time;

S22 — Loading, within the fingerprint recognition phase, a plurality of fingerprint pulse signals to a plurality of fingerprint scanning leads, respectively, and for any fingerprint scanning lead of the plurality of fingerprint scanning leads, a time when a fingerprint pulse signal is loaded to the fingerprint scanning lead and is in an active level state falls within a time period corresponding to the second level signal.

Fig. 10

S41 — Loading, within a fingerprint recognition phase, a plurality of operating signals to a plurality of operating signal leads, each operating signal including a plurality of first level signals and a plurality of second level signals that are loaded alternately, and a time that the operating signal switches between a first level signal and a second level signal being a switching time;

S42 — Loading, within the fingerprint recognition phase, a plurality of fingerprint pulse signals to a plurality of fingerprint scanning leads, respectively, wherein among some fingerprint scanning leads of the plurality of fingerprint scanning leads, a time when a fingerprint pulse signal is loaded to each fingerprint scanning lead and is in an active level state falls within a time period corresponding to a first level signal; and among other fingerprint scanning leads of the plurality of fingerprint scanning leads, a time when a fingerprint pulse signal is loaded to each fingerprint scanning lead and is in an active level state falls within a time period corresponding to a second level signal.

Fig. 15

DRIVING METHOD AND DRIVING DEVICE OF DISPLAY PANEL, AND DISPLAY APPARATUS

TECHNICAL FIELD

The present disclosure relates to a technical field of display technology, and particularly, to a driving method and a driving device of a display panel, and a display apparatus.

BACKGROUND

At present, for liquid crystal display (LCD) products with touch and display driver integration (TDDI), there are typically two TDDI driving modes, namely, a long vertical mode (abbreviated as "Long-V mode") and a long horizontal mode (abbreviated as "Long-H mode"). The Long-V mode is to drive touch sensors to detect touch signals every time a display frame ends; and the Long-H mode is to divide an entire period of a frame of display image into N (N is usually set at eight) equal parts and insert operating times of the touch sensors into an interval between every two adjacent parts in the N parts, which can obtain a faster touch detection speed than that of the Long-V mode and therefore improve the detection speed and performance of touch function. For that reason, a TDDI driving method based on the Long-H mode is usually applied to LCD products with TDDI.

Further, with the ongoing development of fingerprint recognition technology, under-screen fingerprint recognition is rising in popularity in the market. At present, it is possible to embed fingerprint sensors into display panels of LCD products (this method is usually referred to as In-cell method), thereby achieving the under-screen fingerprint recognition.

SUMMARY

Embodiments of the present disclosure provide a driving method of a display panel, a driving device and a display apparatus.

In a first aspect, embodiments of the present disclosure provide a driving method of a display panel, the display panel including a fingerprint recognition module, a gate driving circuit for display driving, a plurality of operating signal leads configured to provide a plurality of operating signals to the gate driving circuit and a plurality of fingerprint scanning leads configured to transmit a plurality of fingerprint pulse signals to the fingerprint recognition module; an operating process of the display panel including a plurality of fingerprint recognition phases and a plurality of display phases which alternate with each other; and the driving method including:

loading, within a fingerprint recognition phase, the plurality of operating signals to the plurality of operating signal leads and the plurality of fingerprint pulse signals to the plurality of fingerprint scanning leads, respectively;

each operating signal including a plurality of first level signals and a plurality of second level signals that are loaded alternately, and a time that corresponds to the operating signal's switching between a first level signal and a second level signal being a switching time; and for any fingerprint scanning lead of the plurality of fingerprint scanning leads, a time when a fingerprint pulse signal is loaded to the fingerprint scanning lead and is in an active level state not overlapping with a switching time.

In some embodiments, for any fingerprint scanning lead of the plurality of fingerprint scanning leads, a time when a fingerprint pulse signal is loaded to the fingerprint scanning lead and is in an active level state falls within a time period corresponding to a second level signal.

In some embodiments, for any fingerprint scanning lead of the plurality of fingerprint scanning leads, a time when a fingerprint pulse signal is loaded to the fingerprint scanning lead and is in an active level state falls within a time period corresponding to a first level signal.

In some embodiments, among some fingerprint scanning leads of the plurality of fingerprint scanning leads, a time when a fingerprint pulse signal is loaded to each fingerprint scanning lead and is in an active level state falls within a time period corresponding to a first level signal; and among other fingerprint scanning leads of the plurality of fingerprint scanning leads, a time when a fingerprint pulse signal is loaded to each fingerprint scanning lead and is in an active level state falls within a time period corresponding to a second level signal.

In some embodiments, among respective time periods corresponding to at least some second level signals of the plurality of second level signals, a time period corresponding to any second level signal corresponds to a plurality of fingerprint scanning leads, and respective times when fingerprint pulse signals are loaded to the plurality of fingerprint scanning leads and are in active level states fall within the time period corresponding to the second level signal to which the plurality of fingerprint scanning leads correspond.

In some embodiments, the display panel further includes a touch module and a plurality of sub-pixel units, the operating process of the display panel further includes a plurality of touch phases, and the driving method further includes:

outputting a plurality of display driving signals through the gate driving circuit to the plurality of sub-pixel units of the display panel, within a display phase; and controlling the gate driving circuit to suspend outputting of the plurality of display driving signals, and providing a plurality of touch driving signals to the touch module, within a touch phase.

In some embodiments, the display phase includes a plurality of sub-display phases, and a touch phase is situated between every two adjacent sub-display phases.

In some embodiments, the display phase includes a plurality of sub-display phases, and a touch phase follows the last sub-display phase.

In a second aspect, embodiments of the present disclosure provide a driving device for a display panel, the display panel including a fingerprint recognition module, a gate driving circuit for display driving, a plurality of operating signal leads configured to provide a plurality of operating signals to the gate driving circuit and a plurality of fingerprint scanning leads configured to transmit a plurality of fingerprint pulse signals to the fingerprint recognition module; an operating process of the display panel including a plurality of fingerprint recognition phases and a plurality of display phases which alternate with each other; and the driving device including:

a display control module configured to load, within a fingerprint recognition phase, the plurality of operating signals to the plurality of operating signal leads, each operating signal including a plurality of first level signals and a plurality of second level signals that are loaded alternately, and a time that corresponds to the operating signal's switching between a first level signal and a second level signal being a switching time; and a fingerprint control module configured to load, within the fingerprint recognition phase, the plurality of fingerprint pulse signals to the plurality of fingerprint scanning leads, respectively, and for any fingerprint scanning lead of the plurality of fingerprint scanning leads, a time when a fingerprint pulse signal is loaded to the fingerprint scanning lead and is in an active level state not overlapping with a switching time.

In some embodiments, for any fingerprint scanning lead of the plurality of fingerprint scanning leads, a time when a fingerprint pulse signal is loaded to the fingerprint scanning lead and is in an active level state falls within a time period corresponding to a second level signal.

In some embodiments, for any fingerprint scanning lead of the plurality of fingerprint scanning leads, a time when a fingerprint pulse signal is loaded to the fingerprint scanning lead and is in an active level state falls within a time period corresponding to a first level signal.

In some embodiments, among some fingerprint scanning leads of the plurality of fingerprint scanning leads, a time when a fingerprint pulse signal is loaded to each fingerprint scanning lead and is in an active level state falls within a time period corresponding to a first level signal; and among other fingerprint scanning leads of the plurality of fingerprint scanning leads, a time when a fingerprint pulse signal is loaded to each fingerprint scanning lead and is in an active level state falls within a time period corresponding to a second level signal.

In some embodiments, among respective time periods corresponding to at least some second level signals of the plurality of second level signals, a time period corresponding to any second level signal corresponds to a plurality of fingerprint scanning leads, and respective times when fingerprint pulse signals are loaded to the plurality of fingerprint scanning leads and are in active level states fall within the time period corresponding to the second level signal to which the plurality of fingerprint scanning leads correspond.

In some embodiments, the driving device includes a touch and display driver integration chip.

In a third aspect, embodiments of the present disclosure provide a display apparatus, which includes a display panel and the driving device provided in any embodiments as described above.

BRIEF DESCRIPTION OF THE DRAWINGS

FIG. 10 is a flow chart of a driving method of a display panel provided in a second embodiment of the present disclosure;

FIG. 15 is a flow chart of a driving method of a display panel provided in a fourth embodiment of the present disclosure;

DETAILED DESCRIPTION OF THE EXEMPLARY EMBODIMENTS

Figure 1:
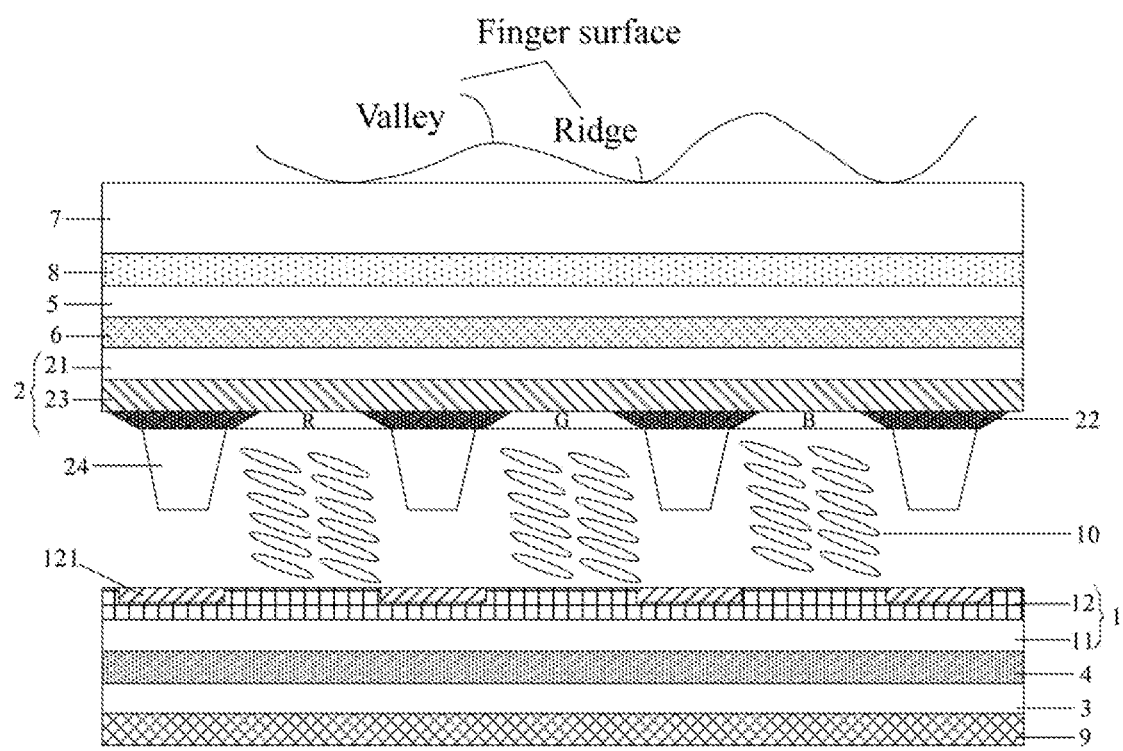
FIG. 1 is a schematic view of a configuration of a display region of a display panel in some embodiments of the present disclosure.

In order to enable a person skilled in the art to better understand the technical solutions of the present disclosure, the driving method of the display panel, the driving device and the display apparatus provided in various embodiments of the present disclosure will be clearly and fully described with reference to the accompanying drawings.

Embodiments of the present disclosure will hereinafter be described more fully with reference to the accompanying drawings. However, the present disclosure may be embodied in many different forms and should not be construed as limited to the embodiments set forth herein. Rather, these embodiments are provided so that the present disclosure will be thorough and complete, and will fully convey the scope of the present disclosure to a person skilled in the art.

The terminology used herein is for the purpose of describing the particular embodiments only and is not intended to limit the scope of the present disclosure. As used herein, the singular forms "a," "an," and "the" are intended to include the plural forms, unless the context clearly indicates otherwise. It is to be understood that the terms "comprise/comprising" and/or "include/including," when used in this specification, specify the presence of stated features, steps, operations, elements, and/or components, but do not preclude the presence or addition of one or more other features, steps, operations, elements, components, and/or groups thereof.

It is to be further understood that, although the terms "first", "second" and the like may be used herein to describe various elements/structures, these elements/structures should not be limited by these terms. These terms are only used to distinguish one element/structure from another.

Unless otherwise defined, all terms (including technical and scientific terms) used herein have the same meaning as commonly understood by a person skilled in the art to which the present disclosure belongs. It is to be further understood that terms, such as those defined in commonly used dictionaries, should be interpreted as having a meaning that is consistent with their meaning in the context of the related art and the present disclosure and will not be interpreted in an idealized or overly formal sense unless expressly so defined herein.

It is to be noted that a transistor used in embodiments of the present disclosure may be a thin-film transistor, a field-effect transistor or any other device with properties identical or similar to the aforesaid transistors; and since a source electrode and a drain electrode of a transistor used in the present disclosure are symmetric, there is no difference between them. In embodiments of the present disclosure, in order to distinguish between a source electrode and a drain electrode of a transistor, one of them is referred to as a first electrode and the other is referred to as a second electrode; and a gate electrode of the transistor is referred to as a control electrode. Further, according to their properties, transistors can be classified into N type and P type. In the following embodiments, description will be made by taking a P-type transistor as example. When the P-type transistor is used, a drain electrode of the P-type transistor is the first electrode, and a source electrode thereof is the second electrode; the reverse is true for an N-type transistor. It is to be understood that a person skilled in the art, without making any creative efforts, could readily derive that the N-type transistor may be used to implement the technical solutions in the following embodiments, which therefore falls within the protection scope of various embodiments of the present disclosure.

Figure 2:
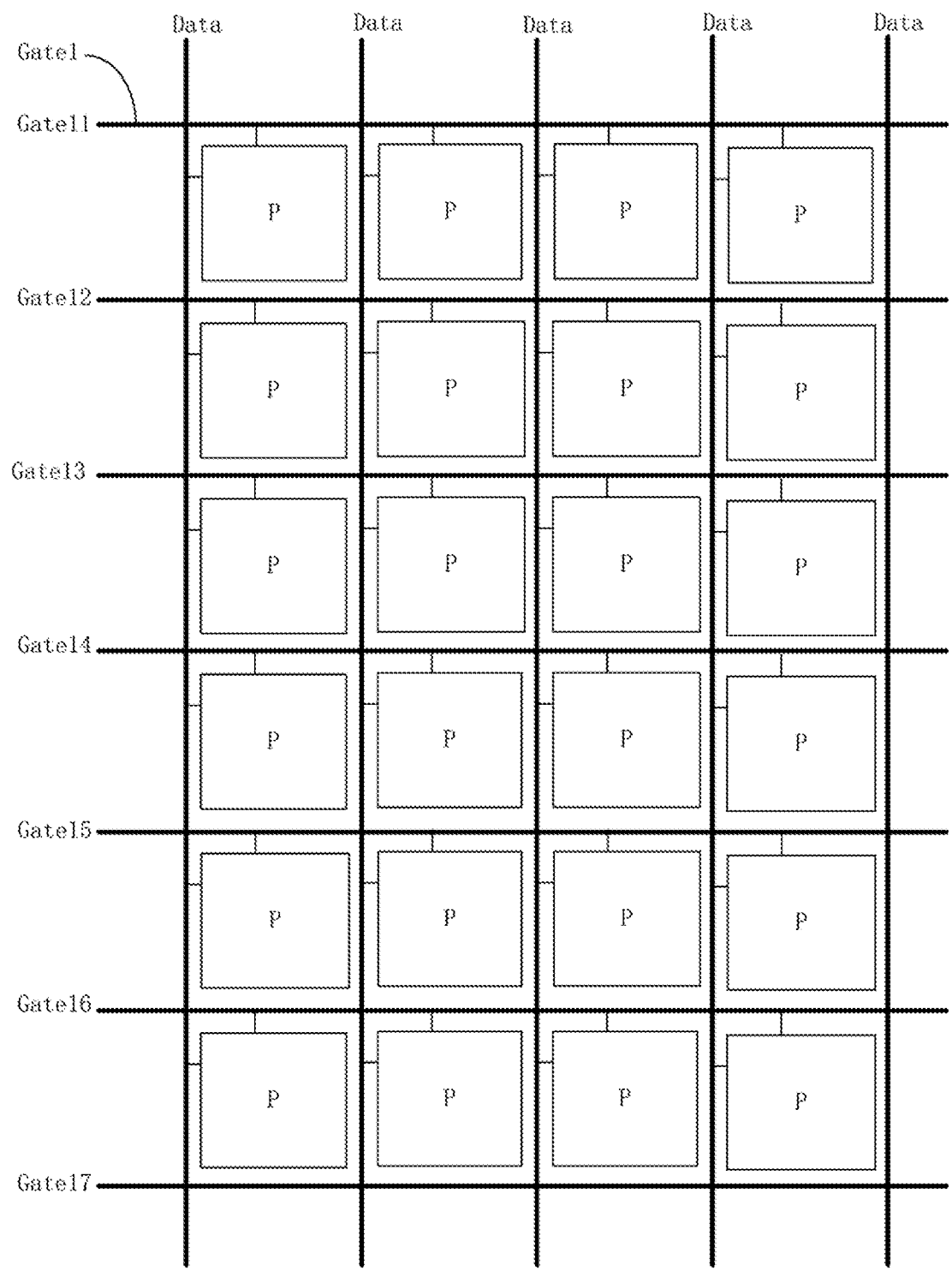
FIG. 2 is a top view of the display panel shown in FIG. 1.

FIG. 1 is a schematic view of a configuration of a display region of a display panel in some embodiments of the present disclosure, and FIG. 2 is a top view of the display panel shown in FIG. 1. As shown in FIGS. 1 and 2, in some embodiments of the present disclosure, the display panel includes an array substrate 1 and a color filter substrate 2 arranged opposite to each other, and is divided into a display region and a non-display region arranged around the display region. FIGS. 1 and 2 show a configuration of the display panel in the display region.

In the display panel, the array substrate 1 includes a first base 11 and a plurality of pixel units on the base 11, and each pixel unit includes a plurality of sub-pixel units P, which are situated in the display region. As shown in FIG. 2, the plurality of pixel units may be arranged in an array, and the plurality of sub-pixel units P in each pixel unit may also be arranged in an array. It is to be noted that FIG. 2 only exemplarily shows the plurality of sub-pixel units P being arranged in an array, which falls within the scope of various embodiments of the present disclosure, but is not intended to limit the present disclosure. Alternatively, the plurality of sub-pixel units P may be arranged in other manners.

The color filter substrate 2 includes a second base 21 and a color resist layer on the second base 21; the color resist layer includes a plurality of color resists, which are situated in regions corresponding to the plurality of sub-pixel units P on the second base 2 and are arranged to correspond to the plurality of sub-pixel units P, respectively. For example, as shown in FIG. 1, the plurality of color resists include a red color resist R, a green color resist G and a blue color resist B.

In some embodiments of the present disclosure, the color resist layer is situated on one side of the second base 21 proximal to the first base 11. In some embodiments, the color resist layer may alternatively be situated on one side of the second base 21 distal to the first base 11. In some embodiments, a resin layer 23 is further arranged on the side of the second base 21 proximal to the first base 11, and the color resist layer is situated on one side of the resin layer 23 proximal to the first base 11.

In some embodiments of the present disclosure, a black matrix (BM) 22 is arranged between two adjacent color resists (e.g., a red color resist R and a green color resist G).

In some embodiments, a plurality of post spacers (PS) 24 are further arranged on one side of the black matrix 22 proximal to the first base 11.

In some embodiments of the present disclosure, as shown in FIG. 2, in the display region, the array substrate 1 further includes a plurality of first gate scanning lines Gate 1 (e.g., Gate 11 to Gate 17) arranged to extend along a row direction and a plurality of data lines Data arranged to extend along a column direction, which are situated on the first base 11, wherein the plurality of first gate scanning lines Gate 1 (e.g., Gate 11 to Gate 17) and the plurality of data lines Data are arranged to cross one another and define a plurality of sub-pixel units P, and each first gate scanning line Gate 1 is configured to provide a gate scanning signal (display driving signal) Vgate to corresponding sub-pixel units P connected thereto, and each data line Data is configured to provide a data signal Vdata to corresponding sub-pixel units P connected thereto.

It is to be noted that FIG. 2 only exemplarily shows that the array substrate 1 includes sub-pixel units P arranged in six rows and four columns, and accordingly, the first gate scanning lines Gate 1 and the data lines Data are distributed in seven rows and five columns, respectively, which fall within the scope of various embodiments of the present disclosure, but are not intended to limit the present disclosure. Alternatively, the display panel provided in some embodiments of the present disclosure may include sub-pixel units P arranged in fewer or more rows and columns than those shown in FIG. 2, and accordingly, the first gate scanning lines Gate 1 and the data lines Data may be respectively distributed in fewer or more rows and columns than those shown in FIG. 2, which may be configured according to practical needs.

In some embodiments of the present disclosure, each sub-pixel unit P includes a first thin-film transistor (TFT) (not shown), a pixel electrode (not shown) and a common electrode (not shown), which are situated on the first base 11. Specifically, the first thin-film transistor, the pixel electrode and the common electrode may be situated on one side of the first base 11 proximal to the color filter substrate 2. The control electrode of the first thin-film transistor is connected to a first gate scanning line Gate 1 in a corresponding row; the first electrode thereof is connected to a data line Data in a corresponding column; and the second electrode thereof is connected to a corresponding pixel electrode. A gate scanning signal Vgate is provided through the gate scanning line Gate 1 to the control electrode of the first thin-film transistor in the corresponding row to control the first thin-film transistor to be turned on; a data signal Vdata is written by the data line Data into the corresponding pixel electrode through the first thin-film transistor that is turned on; and a common electrode signal Vcom is provided through a common electrode line (not shown) to the corresponding common electrode connected thereto, thereby driving the display panel to realize display function.

In some embodiments of the present disclosure, the display region further includes a touch module (not shown), which is arranged in the array substrate 1 by the In-cell method and situated on one side of the color filter substrate 2 proximal to the first base 11. In some embodiments, the touch module includes touch driving lines (not shown) and touch sensing lines (not shown). The touch driving lines are configured to receive touch driving signals and the touch sensing lines are configured to feed touch sensing signals back in a touch phase, thereby realizing touch detection.

In some embodiments of the present disclosure, as shown in FIG. 1, the display region further includes a fingerprint recognition module 12 (not shown), which is arranged in the array substrate 1 by the In-cell method and situated on one side of the first base 11 proximal to the color filter substrate 2, wherein the fingerprint recognition module 12 includes a plurality of fingerprint recognition units 121, which may be arranged in an array.

In some embodiments of the present disclosure, as shown in FIG. 1, each fingerprint recognition unit 121 is situated in a region corresponding to a spacing between two adjacent sub-pixel units P, i.e., a region corresponding to a black matrix 22; and an opening (not shown) is formed in the black matrix 22 corresponding to the fingerprint recognition unit 121, such that light rays from a backlight source 9 may illuminate a surface of a finger through the opening and the light rays may be reflected back to the fingerprint recognition unit 121 by the surface of the finger.

Figure 3:
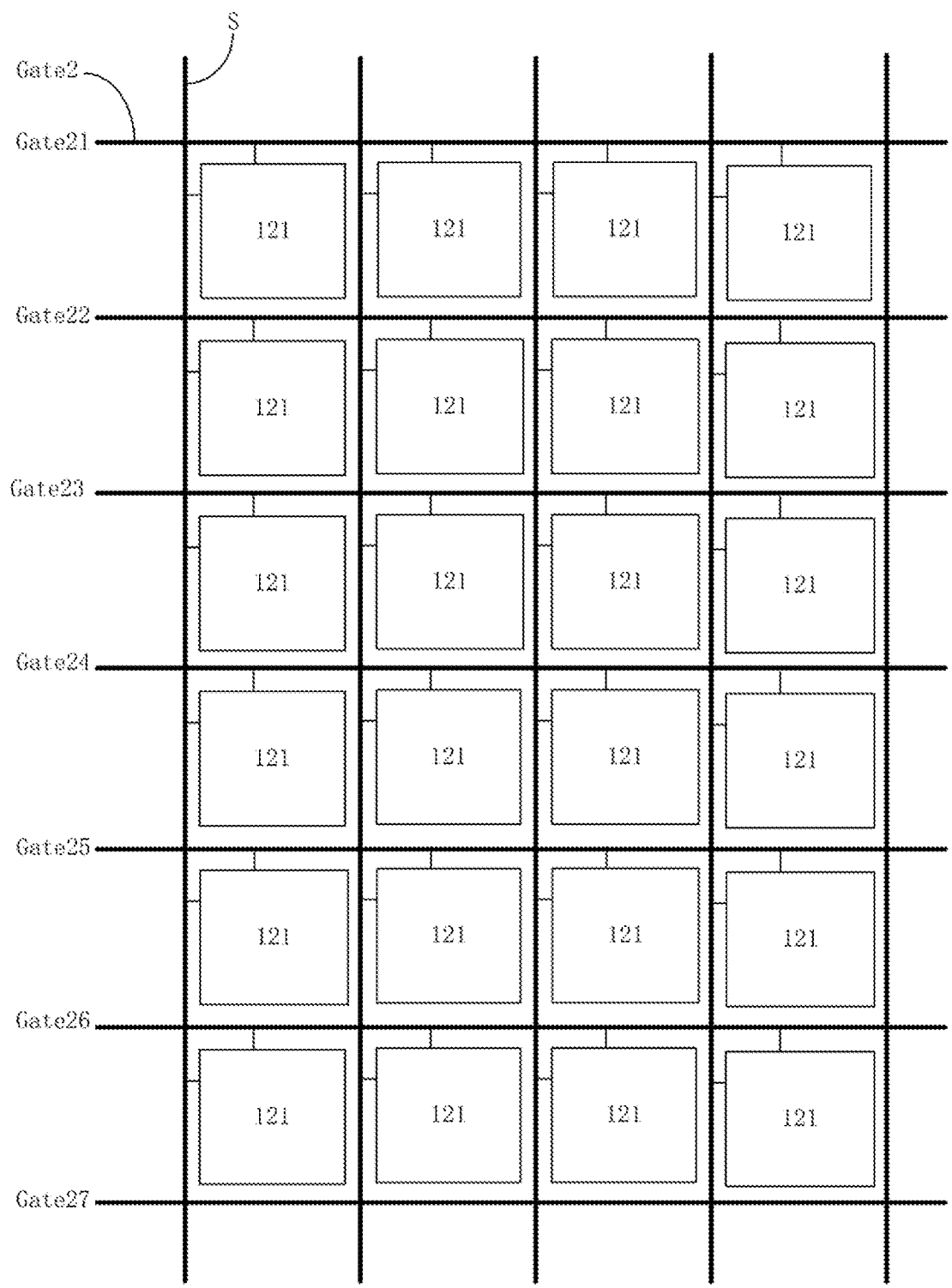
FIG. 3 is a schematic view of a distribution of fingerprint recognition units 121 of the display panel shown in FIG. 1.

FIG. 3 is a schematic view of a distribution of fingerprint recognition units 121 of the display panel shown in FIG. 1. In some embodiments of the present disclosure, the display region further includes a plurality of second gate scanning lines Gate 2 arranged to extend along the row direction and a plurality of fingerprint sensing signal lines S arranged to extend along the column direction, and the plurality of second gate scanning lines Gate 2 and the plurality of fingerprint sensing signal lines S cross one another to define a plurality of fingerprint recognition units 121, wherein each second gate scanning line Gate 2 is connected to fingerprint recognition units 121 in a corresponding row, and each fingerprint sensing signal line S is connected to fingerprint recognition units 121 in a corresponding column; the second gate scanning line Gate 2 is configured to provide a fingerprint pulse signal to the corresponding fingerprint recognition units 121 connected thereto, and the fingerprint pulse signal includes an active level signal (e.g., high level signal) to turn on the fingerprint recognition units 121; and the fingerprint sensing signal line S is configured to read the touch sensing signals fed back by the corresponding fingerprint recognition units 121 connected thereto in order for a fingerprint detection system to generate a fingerprint image based on the touch sensing signals fed back by the fingerprint recognition units 121, thereby realizing fingerprint recognition function of the display panel.

It is to be noted that FIG. 3 only exemplarily shows that the array substrate 1 includes fingerprint recognition units 121 arranged in six rows and four columns, and accordingly, the gate scanning lines Gate 2 and the fingerprint sensing signal lines S are distributed in seven rows and five columns, respectively, which fall within the scope of various embodiments of the present disclosure, but are not intended to limit the present disclosure. Alternatively, the display panel provided in some embodiments of the present disclosure may include fingerprint recognition units 121 arranged in fewer or more rows and columns than those shown in FIG. 3, and accordingly, the second gate scanning lines Gate 2 and the fingerprint sensing signal lines S may be respectively distributed in fewer or more rows and columns than those shown in FIG. 3, which may be configured according to practical needs.

Specifically, in some embodiments of the present disclosure, each fingerprint recognition unit 121 includes a second thin-film transistor (not shown) and a corresponding fingerprint sensor (FPS) (not shown) connected to the second thin-film transistor.

An optical fingerprint sensor may be used as the fingerprint sensor, and it includes a first electrode layer, a photosensitive layer and a second electrode layer arranged successively. A control electrode of the second thin-film transistor is connected to a second gate scanning line Gate 2 in a corresponding row; a first electrode thereof is connected to the second electrode layer of the corresponding fingerprint sensor; a second electrode thereof is connected to a fingerprint sensing signal line S in a corresponding column; and a first electrode layer of the fingerprint sensor is connected to a constant-voltage power supply (not shown).

As shown in FIGS. 1 and 3, a constant voltage is inputted by the constant-voltage power supply to the first electrode layer of the fingerprint sensor, and a fingerprint pulse signal is provided through the second gate scanning line Gate 2 to the control electrode of the second thin-film transistor in the corresponding row, and the fingerprint pulse signal includes an active level signal (e.g., high level signal) to make the second thin-film transistor conductive, thereby controlling the second thin-film transistor to be turned on so as to enable conduction between the fingerprint sensing signal line S and the second electrode layer of the fingerprint sensor. When the surface of the finger touches the display region, light rays reflected by a pattern on the surface of the finger may be absorbed by respective photosensitive layers of fingerprint sensors in a region corresponding to the pattern, strengths of reflected optical signals vary depending on respective heights of ridges and valleys in the pattern on the surface of the finger, and accordingly, electrical signals generated by the fingerprint sensors are different from one another; and therefore, by causing the fingerprint sensing signal lines S to read the electrical signals generated by the fingerprint sensors from respective second electrode layers of the fingerprint sensors in the columns corresponding to these lines, the fingerprint image of the finger can be effectively recognized based on differences among the electrical signals generated by the fingerprint sensors so as to realize the fingerprint recognition function.

Specifically, in some embodiments of the present disclosure, electrical signals (e.g., current signals) generated by various fingerprint sensors may be detected using a progressive scanning method, wherein the second thin-film transistors in each row is turned on by a corresponding second gate scanning line Gate 2 sequentially, thereby enabling conduction between respective second electrode layers of the fingerprint sensors in this row and respective fingerprint sensing signal lines S in columns corresponding to these fingerprint sensors, and thereafter, electrical signals outputted by the second electrode layers of the fingerprint sensors in each column are acquired by the fingerprint sensing signal line S in this column. After the progressive scanning is completed, the electrical signals outputted by various fingerprint sensors are acquired and eventually subjected to the processing of the fingerprint detection system to acquire the fingerprint image of the region touched by the finger, thereby realizing the fingerprint recognition function.

In some embodiments of the present disclosure, as shown in FIG. 1, a first polarizer (POL) 3 is further arranged on one side of the first base 11 distal to the color filter substrate 2, and is attached to the first base 11 by a first optically clear adhesive (OCA) layer 4.

In some embodiments of the present disclosure, as shown in FIG. 1, a second polarizer (POL) 5 is further arranged on one side of the second base 21 distal to the array substrate 1, and is attached to the second base 21 by a second optically clear adhesive (OCA) layer 6. A glass overcoat (OC) 7 is further arranged on one side of the second polarizer 5 distal to the second base 21, and is attached to the second polarizer 5 by a third optically clear adhesive (OCA) layer 8.

In some embodiments of the present disclosure, as shown in FIG. 1, a backlight (BL) source 9 is further arranged on one side of the first polarizer 3 distal to the first base 11.

In some embodiments of the present disclosure, the display panel is a liquid crystal display panel, and as shown in FIG. 1, a liquid crystal layer 10 is further arranged between the array substrate 1 and the color filter substrate 2

In some embodiments of the present disclosure, a gate driving circuit (the gate driving circuit is of a gate-driver-on-array (GOA) type) for display driving is arranged in a non-display region on one side of the display region, and the first gate scanning lines Gate 1 in the display region are connected to the gate driving circuit. A plurality of operating signal leads configured to provide operating signals to the gate driving circuit are arranged on one side of the gate driving circuit distal to the display region and are connected to the gate driving circuit. The gate driving circuit is configured to provide gate scanning signals (display driving signals) to the corresponding first gate scanning lines Gate 1 connected thereto in response to the operating signals provided by the plurality of operating signal leads, The operating signals provided by the plurality of operating signal leads include, without limitation, clock signals CK/CKB, frame triggering signals STV, high level signals VGH, low level signals VGL, reset signals RESET/RST, control signals CN/CNB, touch triggering signals EN_Touch and the like.

In practical applications, the display panel is used in a display apparatus, which further includes a display and touch driving device that may use a TDDI chip, wherein the display and touch driving device may provide a driving timing for display, touch and fingerprint recognition, for example, it may provide the operating signals to the plurality of operating signal leads connected to the gate driving circuit to control the gate driving circuit to enter a display or touch phase.

There are two touch driving modes for the TDDI chip, namely, a long vertical mode (abbreviated as "Long-V mode") and a long horizontal mode (abbreviated as "Long-H mode"). The Long-V mode is to perform touch driving for touch detection every time a display frame (a display phase) ends; and the Long-H mode is to divide an entire period (display phase) of a frame of display image into N (N is usually set at eight) equal parts and insert operating times of the touch sensors into an interval between every two adjacent parts in the N parts, which can obtain a faster touch detection speed and better performance compared to the Long-V mode.

Figure 4:
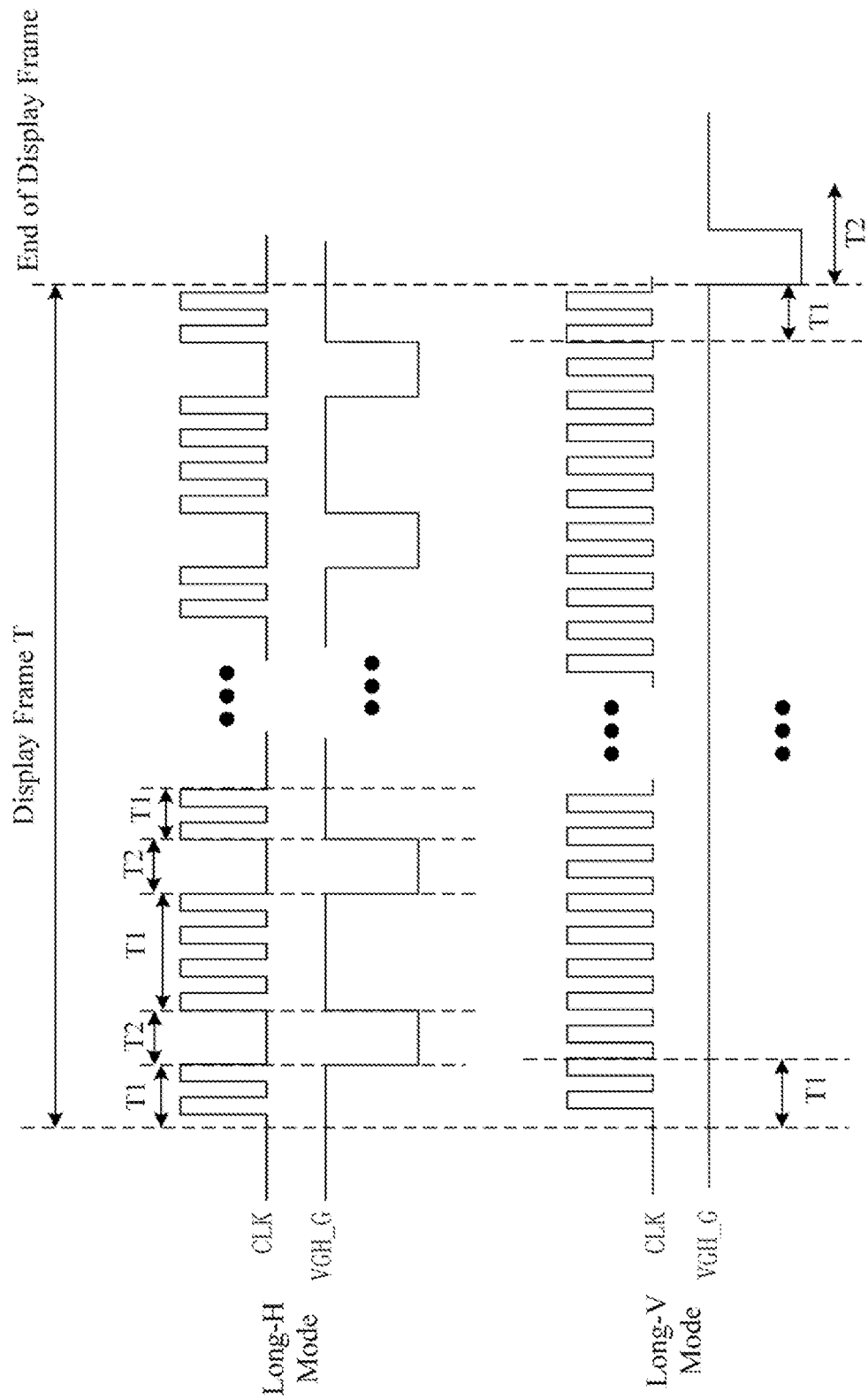
FIG. 4 is a diagram showing respective driving timings for display and touch under Long-H mode and Long-V mode.

FIG. 4 is a diagram showing respective driving timings for display and touch under the Long-H mode and the Long-V mode. As shown in FIGS. 2 and 4, under the Long-H mode, a time T (display phase) of a display frame includes a plurality of sub-display phases T1, and a touch phase T2 is situated between every two adjacent sub-display phases T1, i.e., under the Long-H mode, display and touch operations are performed multiple times in one display frame. The gate driving circuit is configured to provide, in a sub-display phase T1 within the time T of the display frame, the gate scanning signals (display driving signals) to the corresponding first gate scanning lines Gate 1 connected thereto so as to turn on the sub-pixel units P respectively connected to the first gate scanning lines Gate 1, thereby realizing the display driving; the gate driving circuit does not output the gate scanning signals in a touch phase T2 within the time T of the display frame so as to enter the touch phase to perform touch driving. In the touch phase T2 within the time T of the display frame, the TDDI chip provides the touch driving signals to the corresponding touch driving lines connected thereto and receives the touch sensing signals fed back by the touch sensing lines, thereby realizing the touch driving and detection. Within the touch phase T2, a display driving signal clock (CLK) is temporarily stopped, which means that, within the touch phase T2, display data is not updated, i.e., the data signals written into the pixel electrodes are not updated; and within the touch phase T2, some characteristic signals or a power supply being inputted into the gate driving circuit may be placed into a specific level state, for example, as shown in FIG. 4, the high level signal VGH_G is pulled down within this phase.

As shown in FIGS. 2 and 4, under the Long-V mode, the gate driving circuit is configured to provide, within the time T (display phase) of the display frame, the gate scanning signals to the corresponding first gate scanning lines Gate 1 connected thereto so as to turn on the sub-pixel units P respectively connected to the first gate scanning lines Gate 1, thereby realizing the display driving; once the time T (display phase) of the display frame ends, the gate driving circuit does not output the gate scanning signals and enters the touch phase T2, and the TDDI chip provides the touch driving signals to the corresponding touch driving lines connected thereto, thereby realizing touch driving. In other words, under the Long-V mode, there is no touch operation within the time T (display phase) of the display frame; and the display driving signal clock (CLK) is not stopped until the refreshing of the frame of display image is completed (i.e, until the end of the display frame), and once the display driving signal clock (CLK) is stopped, the touch driving and detection are performed.

Figure 5:
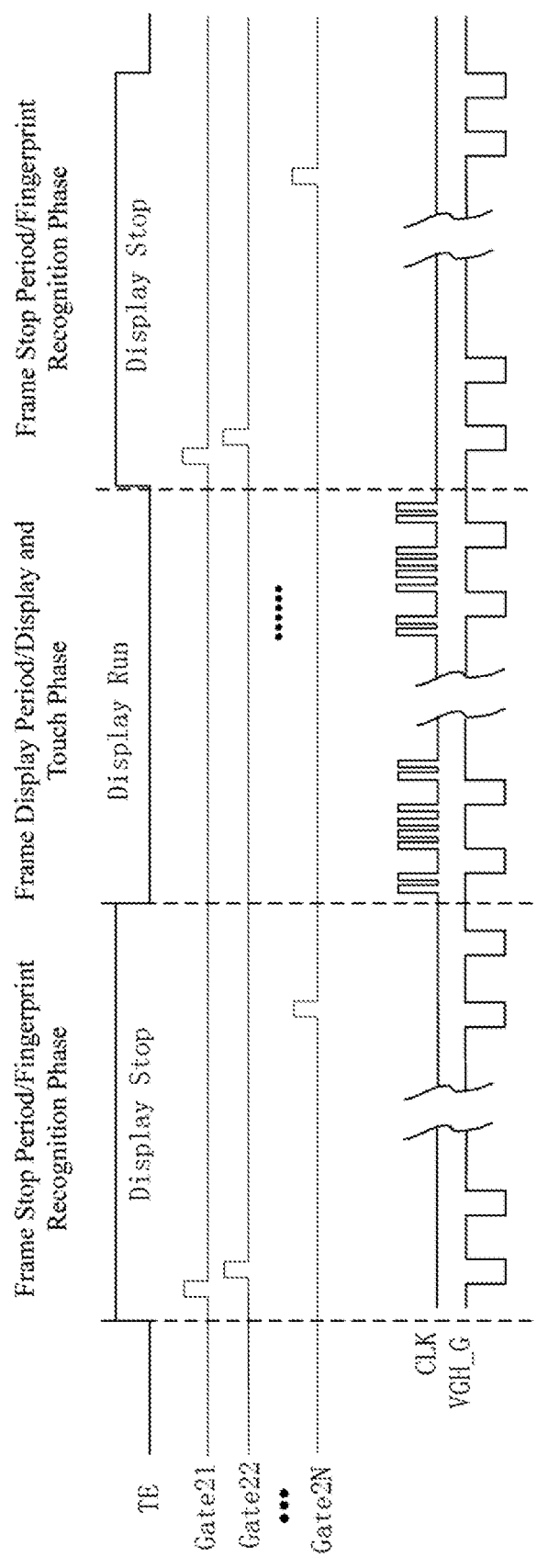
FIG. 5 is a diagram showing a driving timing for display, touch and fingerprint recognition under Long-H mode.

FIG. 5 is a diagram showing a driving timing for display, touch and fingerprint recognition under Long-H mode. As shown in FIG. 5, the TDDI chip inputs a tearing effect (TE) signal to the fingerprint detection system in order for the fingerprint detection system to perform fingerprint detection based on the TE signal. The TE signal includes frame stop periods Display Stop (i.e., fingerprint recognition phases) and frame display periods Display Run (i.e., display and touch phases); a frame display period starts when the TE signal becomes low level, whereas a frame stop period starts when the TE signal becomes high level.

As shown in FIGS. 3 and 5, the fingerprint scanning is performed within the frame stop period, and by the progressive scanning method, the fingerprint pulse signals are provided to the second gate scanning line Gates 2 row by row, so as to turn on one row of fingerprint recognition units 121 after another to perform the fingerprint recognition. Within the frame stop period, some characteristic signals (e.g, a VGH_G signal) or a power supply being inputted into the gate driving circuit remains active (i.e., there are changes in these signals), but there is no signal output from the gate driving circuit for display, and therefore, no new data signals are written into the pixel electrodes, i.e., the display image is not updated.

Within the frame display period, fingerprint scanning is stopped, and the display and touch driving based on the Long-H mode is performed, as shown in FIG. 4.

Figure 6:
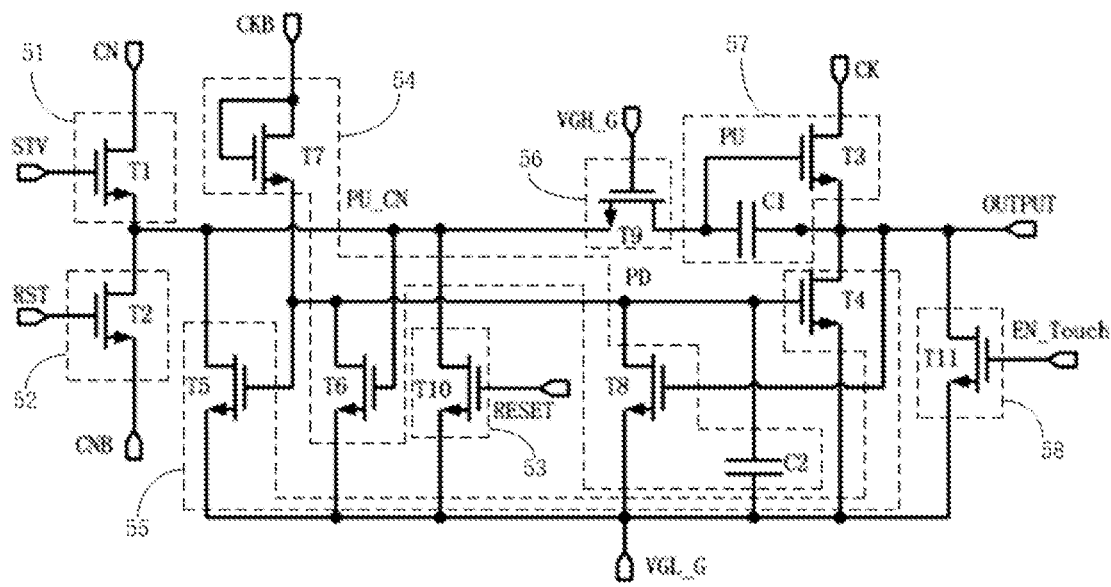
FIG. 6 is a schematic view of a configuration of a shift register of a first gate driving circuit provided in some embodiments of the present disclosure.

In some embodiments of the present disclosure, the gate driving circuit includes a plurality of shift registers in cascade connection. FIG. 6 is a schematic view of a configuration of a shift register of a gate driving circuit provided in some embodiments of the present disclosure. As shown in FIG. 6, the shift register of the gate driving circuit adopts a 11T2C structure (i.e., eleven transistors and two capacitors), and the shift register includes a first input circuit 51, a second input circuit 52, a reset circuit 53, a first control circuit 54, a second control circuit 55, an anti-leakage circuit 56, an output circuit 57 and a touch enable circuit 58.

The first input circuit 51 includes a first transistor T1, a control electrode of which is connected to a frame triggering signal terminal STV, a first electrode of which is connected to a first control signal terminal CN, and a second electrode of which is connected to a first pull-up node PU_CN. The first input circuit 51 is configured to write a first control signal provided by the first control signal terminal CN into the first pull-up node PU_CN in response to the control of the frame triggering signal terminal STV The second input circuit 52 includes a second transistor T2, a control electrode of which is connected to a first reset signal terminal RST, a first electrode of which is connected to the first pull-up node PU_CN, and a second electrode of which is connected to a second control signal terminal CNB. The second input circuit 52 is configured to write a second control signal provided by the second control signal terminal CNB into the first pull-up node PU_CN in response to the control of the first reset signal terminal RST, wherein the signal provided by the second control signal terminal CNB and the signal provided by the first control signal terminal CN are opposite to each other, and if one of them is a high level signal, the other is a low level signal.

The output circuit 57 includes: a third transistor T3, a control electrode of which is connected to a second pull-up node PU, a first electrode of which is connected to a first clock signal terminal CK, and a second electrode of which is connected to a signal output terminal OUTPUT; and a first capacitor, a first end of which is connected to the second pull-up node PU, and a second end of which is connected to the signal output terminal OUTPUT. The output circuit 57 is configured to write a clock signal provided by the first clock signal terminal CK into the signal output terminal OUTPUT in response to the control of the second pull-up node PU.

The second control circuit 55 includes: a fourth transistor T4, a control electrode of which is connected to a pull-down PD, a first electrode of which is connected to the signal output terminal OUTPUT, and a second electrode of which is connected to a low-level signal terminal VGL_G; and a fifth transistor T5, a control electrode of which is connected to the pull-down node PD, a first electrode of which is connected to the first pull-up node PU_CN, and a second electrode of which is connected to the low level signal terminal VGL_G. The second control circuit 55 is configured to write a low level signal provided by the low-level signal terminal VGL_G into the first pull-up node PU_CN and the output terminal OUTPUT in response to the control of the pull-down node PD so as to perform noise reduction control on the first pull-up node PU_CN and the signal output terminal OUTPUT.

The first control circuit 54 includes: a sixth transistor T6, a control electrode of which is connected to the first pull-up node PU_CN, a first electrode of which is connected to the pull-down node PD, and a second electrode of which is connected to the low-level signal terminal VGL_G; a seventh transistor T7, a control electrode and a first electrode of which are connected to a second clock signal terminal CKB, and a second electrode of which is connected to the pull-down node PD; and an eighth transistor T8, a control electrode of which is connected to the signal output terminal OUTPUT, a first electrode of which is connected to the pull-down node PD, and a second electrode of which is connected to the low-level signal terminal VGL_G; and a second capacitor C2. The first control circuit 54 is configured to write the low level signal provided by the low-level signal terminal VGL_G into the pull-down node PD in response to the control of the first pull-up node PU_CN; write a clock signal provided by the second clock signal terminal CKB into the pull-down node PD in response to the control of the second clock signal terminal CKB; and write the low level signal provided by the low-level signal terminal VGL_G into the pull-down node PD in response to the control of the signal output terminal OUTPUT.

The anti-leakage circuit 56 includes a ninth transistor T9, a control electrode of which is connected to a high-level signal terminal VGH-G, a first electrode of which is connected to the second pull-up node PU, and a second electrode of which is connected to the first pull-up node PU_CN. The anti-leakage circuit 56 is configured to connect the first pull-up node PU_CN and the second pull-up node PU in response to the control of the high-level signal terminal VGH_G.

The reset circuit 53 includes a tenth transistor T10, a control electrode of which is connected to a second signal terminal RESET, a first electrode of which is connected to the first pull-up node PU_CN, and a second electrode of which is connected to the low-level signal terminal VGL_G. The reset circuit 53 is configured to write the low level signal provided by the low-level signal terminal VGL_G into the first pull-up node PU_CN in response to the control of the second reset signal terminal RESET so as to perform reset control on the first pull-up node PU_CN.

The touch enable circuit 58 includes an eleventh transistor T11, a control electrode of which is connected to a touch triggering signal terminal EN_Touch, a first electrode of which is connected to the signal output terminal OUTPUT, and a second electrode of which is connected to the low-level signal terminal VGL_G. The touch enable circuit 58 is configured to write the low level signal provided by the low-level signal terminal VGL_G into the signal output terminal OUTPUT in response to the control of the touch triggering signal terminal EN_Touch, so as to perform control to stop the display driving and start the touch phase for touch detection.

In the gate driving circuit, the signal output terminal OUTPUT of a shift register at each level is connected to a corresponding first gate scanning line Gate 1 in order to transmit the required gate scanning signal to the corresponding first gate scanning line Gate 1 connected thereto. In the touch phase, the signal output terminal OUTPUT of the shift register does not output the gate scanning signal.

Figure 7:
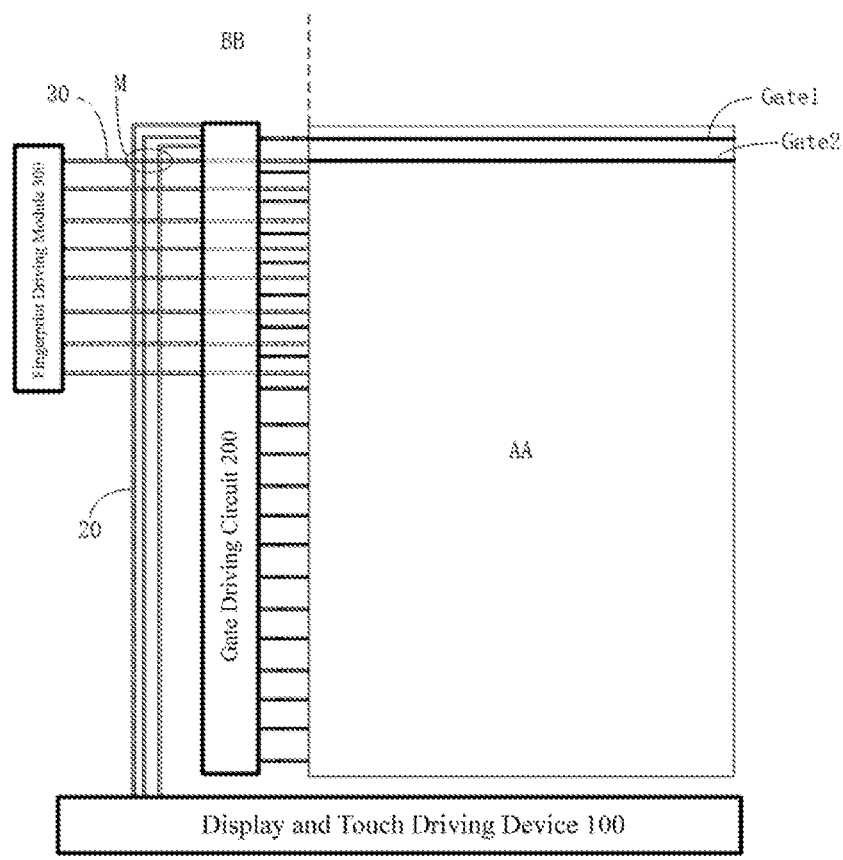
FIG. 7 is a schematic view of a configuration of a non-display region of a display panel provided in some embodiments of the present disclosure.

FIG. 7 is a schematic view of a configuration of a non-display region of a display panel provided in some embodiments of the present disclosure. As shown in FIGS. 3 and 7, in some embodiments of the present disclosure, a display and touch driving device 100 is arranged in the non-display region BB on another side of the display region AA (e.g., one side of the display region AA along the column direction); this side may be arranged to adjoin the side of the display region AA as described above; and the display and touch driving device 100 may use a TDDI chip and may be implemented in a Chip-on-Film (COF) manner. The display and touch driving device 100 may provide a driving timing for display, touch and fingerprint recognition; for example, the display and touch driving device 100 may provide operating signals to the plurality of operating signal leads 20 connected to the gate driving circuit 200 to control the gate driving circuit 200 to enter a display or touch phase.

In some embodiments, the display and touch driving device 100 is further connected to the touch driving lines and the touch sensing lines of the touch module in the display region AA to output touch driving signals to the touch driving lines and receive touch sensing signals fed back by the touch sensing lines in the touch phase, thereby realizing the touch detection.

In some embodiments, the display panel further includes a touch driving circuit (not shown) for the touch driving; the touch driving circuit is connected to the touch driving lines in the touch module to provide touch driving signals to these lines; and the display and touch driving device 100 is connected to the touch sensing lines to receive touch sensing signals fed back by the touch sensing lines, thereby realizing the touch detection. In some embodiments, the touch driving circuit and the above-described gate driving circuit are a single driving circuit.

In some embodiments, a source driver (not shown) may be further integrated with the display and touch driving device 100 to provide data signals Vdata to the data signal lines DATA connected thereto. In some embodiments, a fingerprint sensing module (not shown) may be further integrated with the display and touch driving device 100, and the fingerprint sensing module is connected to the fingerprint sensing lines S to receive signals read from the fingerprint sensors via these lines in order for the fingerprint detection system to detect and recognize the fingerprint image.

In some embodiments, the fingerprint sensing module (not shown) connected to fingerprint sensing lines S may be arranged in the non-display region BB on one side of the display region AA opposite to the other side as described above and implemented in the Chip-on-Film (COF) manner; and the fingerprint sensing module receives signals read from the fingerprint sensors via the fingerprint sensing lines S in order for the fingerprint detection system to detect and recognize the fingerprint image.

In some embodiments of the present disclosure, as shown in FIGS. 3 and 7, the first gate scanning lines Gate 1 in the display region AA extend from the display region AA to the non-display region BB on one side of the display region AA and are connected to the gate driving circuit 200 arranged in the non-display region BB on this side of the display region AA.

In some embodiments of the present disclosure, the plurality of operating signal lines 20 are arranged on one side of the gate driving circuit 200 distal to the display region AA to provide operating signals to the gate driving circuit 200; and the operating signals provided by the plurality of operating signal lines 20 include, without limitation, clock signals CK/CKB, frame triggering signals STV, high level signals VGH, low level signals VGL, reset signals RESET/RST, control signals CN/CNB, touch triggering signals EN_Touch and the like.

In some embodiments of the present disclosure, a bonding region is arranged on the side of the gate driving region 200 distal to the display region AA, and a fingerprint driving module 300 is arranged in the bonding region. Therefore, the second gate scanning lines Gate 2, which are situated in the display region AA and configured to provide fingerprint pulse signals, need to extend from the display region AA to the non-display region BB on one side of the display region AA to be connected to the fingerprint driving module so as to receive the fingerprint pulse signals generated by the fingerprint driving module 300, thereby realizing the fingerprint scanning and recognition. The fingerprint driving module 300 may be implemented in the Chip-on-Film (COF) manner.

Specifically, fingerprint scanning leads 30 configured to transmit the fingerprint pulse signals to the second gate scanning lines Gate 2 are further arranged in the non-display region BB on one side of the display region AA, and one end of each fingerprint sensing lead 30 is connected to a corresponding second gate scanning line Gate 2, and the other end thereof is connected to the fingerprint driving module 300, such that the fingerprint scanning lead 30 may receive a fingerprint pulse signal provided by the fingerprint driving module 300 and output the fingerprint pulse signal to the corresponding second gate scanning line Gate 2 connected thereto, thereby driving corresponding fingerprint recognition units 121 to perform fingerprint detection.

It is to be noted that FIG. 7 only exemplarily shows some operating signal leads 20, some first gate scanning lines Gate 1, some fingerprint scanning leads 30 and some second gate scanning lines Gate 2, which all fall within the scope of various embodiments of the present application, but are not intended to limit the present disclosure.

Figure 8:
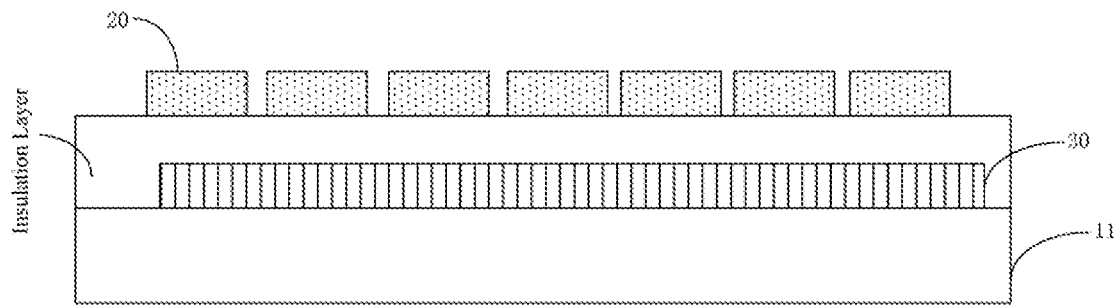
FIG. 8 is a cross-sectional view of an M region in FIG. 7.

FIG. 8 is a cross-sectional view of an M region in FIG. 7. As can be seen from the structure shown in FIGS. 7 and 8, in comparative embodiments, an insulation layer is arranged between the fingerprint scanning leads 30 and the operating signal leads 20. There are overlapping regions between respective orthographic projections of the fingerprint scanning leads 30 configured to transmit the fingerprint pulse signals on the first base 11 and those of the operating signal leads 20 configured to provide the operating signals (e.g., high level signals VGH) to the gate driving circuit 200 thereon.

The existence of these overlapping regions inevitably results in interference between signals transmitted by the fingerprint scanning leads 30 and those transmitted by the operating signal leads 20. In actual tests, it has been found that under the Long-H mode, the fingerprint image for fingerprint recognition is afflicted with horizontal stripe noise at a fixed interval that is very large (about 25 rows apart). Specifically, as shown in FIG. 5, under the Long-H mode, when driving for fingerprint scanning is performed within the frame stop period Display Stop, the fingerprint scanning leads 30 are providing the fingerprint pulse signals to the corresponding second gate scanning lines Gate 2 connected thereto; however, some characteristic signals (e.g., VGH_G signals) or a power supply being inputted into the gate driving circuit 200 remains active (there are changes in these signals), i.e., like the fingerprint pulse signals, there are changes in the signals provided by the operating signal leads 20; accordingly, there is interference resulting from the superposition of actions of the signals provided by the operating signal leads 20 and those of the signals provided by the fingerprint scanning leads 30, whereby the fingerprint recognition units 121 do not operate properly, which results in the horizontal stripe noise at the fixed interval in the recognized fingerprint image and hence affects the effects of finger recognition and product experience.

First Embodiment

Figure 9:
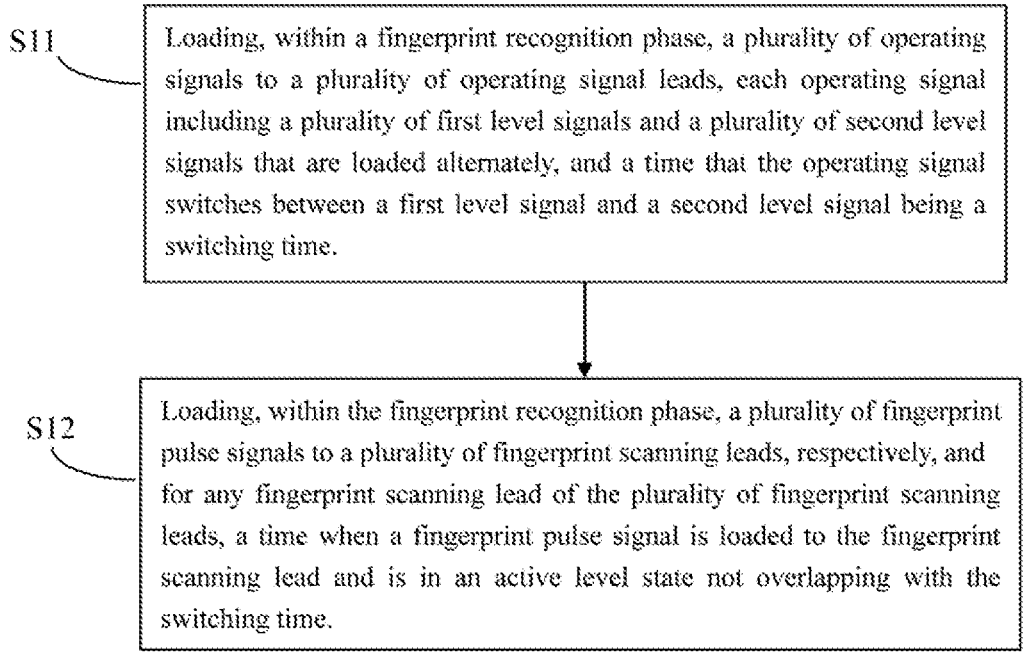
FIG. 9 is a flow chart of a driving method of a display panel provided in a first embodiment of the present disclosure.

In order to effectively solve the problem of the horizontal stripe noise at the fixed interval in the fingerprint image, a first embodiment of the present application provides a driving method of a display panel, wherein the display panel is the same display panel as described above, and its operating process includes fingerprint recognition phases and display phases that alternate with the fingerprint recognition phases. FIG. 9 is a flow chart of a driving method of a display panel provided in the first embodiment of the present disclosure. As shown in FIG. 9, the driving method includes the following steps:

Step S11: Loading operating signals to operating signal leads within a fingerprint recognition phase; each operating signal including first level signals and second level signals that are loaded alternately; and a time that corresponds to the operating signal's switching between a first level signal and a second level signal being a switching time; and Step S12: Loading fingerprint pulse signals to fingerprint scanning leads within the fingerprint recognition phase, respectively, and for any one of these fingerprint scanning leads, a time when a fingerprint pulse signal is loaded to the fingerprint scanning lead and is in an active level state not overlapping with the switching time.

In Step S12, "active level" refers to a voltage capable of controlling a corresponding transistor to be conductive; when a fingerprint pulse signal loaded to a fingerprint scanning lead is in an active level state, a second thin-film transistor in a corresponding fingerprint recognition unit connected to the fingerprint scanning lead is conductive; and the active level state, for example, is a high level state. A time when a fingerprint pulse signal is in an active level state is a time when this fingerprint pulse signal is an active level signal (e.g., high level signal).

In the first embodiment of the present disclosure, since there is no overlap between the time when the fingerprint pulse signal loaded to the fingerprint scanning lead is in the active level state and the time when the operating signal loaded to the operating signal lead switches between the first level signal and the second level signal, jumps in actions of the respective signals loaded to the fingerprint scanning lead and the operating signal lead can be effectively prevented from occurring within the same time period, so as to avoid the interference resulting from the superposition of the action of the signal provided by the operating signal lead and the action of the signal provided by the fingerprint scanning lead and therefore prevent the action of the signal provided by the operating signal lead from affecting the normal operation of the fingerprint recognition unit, thereby effectively mitigating the defect of the horizontal stripe noise in the fingerprint image and improving the effects of the fingerprint recognition and the product experience.

Second Embodiment

Figure 11:
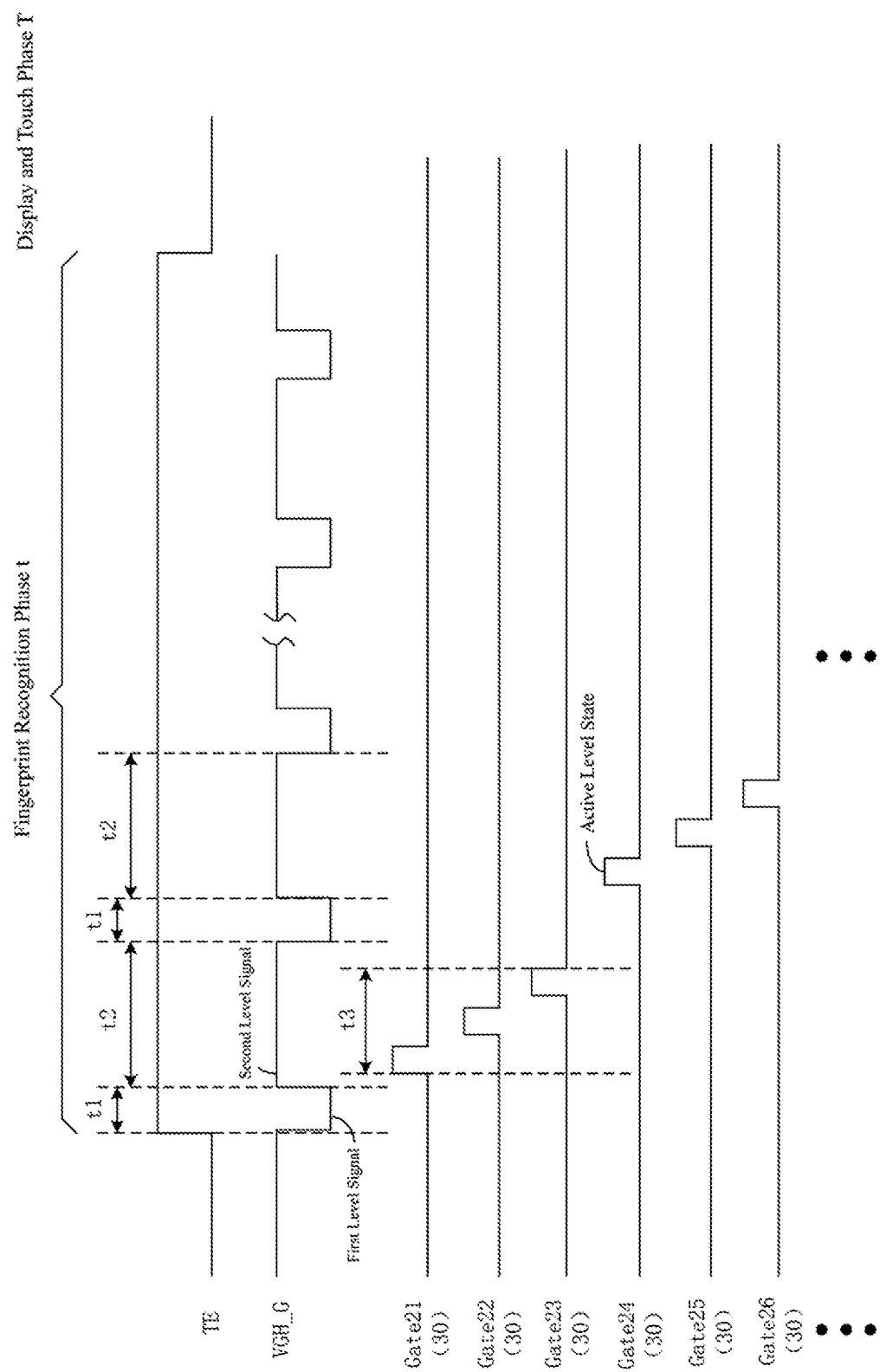
FIG. 11 is a diagram showing a driving timing of the driving method shown in FIG. 10.

In order to effectively solve the problem of the horizontal stripe noise at the fixed interval in the fingerprint image, the second embodiment of the present application provides a driving method of a display panel, wherein the display panel is the same display panel as described above. FIG. 10 is a flow chart of a driving method of a display panel provided in the second embodiment of the present disclosure, and FIG. 11 is a diagram showing a driving timing of the driving method shown in FIG. 10. As shown in FIGS. 10 and 11, an operating process of the display panel includes a plurality of frame driving periods, each of which includes fingerprint recognition phases t and display and touch phases T, and in the operating process of the display panel, the fingerprint recognition phases t alternate with the display and touch phases T. The driving method includes the following steps:

Step S21: Loading operating signals to operating signal leads within a fingerprint recognition phase; each operating signal including first level signals and second level signals that are loaded alternately; and a time that corresponds to the operating signal's switching between a first level signal and a second level signal being a switching time.

Referring to FIGS. 5, 7 and 11, the display and touch driving device 100 outputs a frame driving period signal, i.e., TE signal, and the TE signal includes frame stop periods Display Stop (i.e., fingerprint recognition phases) and frame display periods Display Run (i.e., display and touch phases); and a fingerprint recognition period t starts when the TE signal becomes low level, whereas a display and touch period T when the TE signal becomes high level.

In the second embodiment of the present disclosure, within the fingerprint recognition phase t, the display and touch driving is not performed, and the gate driving circuit 200 does not output any gate scanning signal (display driving signal) for display; however, due to its factory settings, the display and touch driving device 100 continues to load corresponding operating signals to the operating signal leads 20 connected to the gate driving circuit within the fingerprint recognition phase t. An operating signal loaded to an operating signal lead 20 includes second level signals and first level signals that are loaded alternately, i.e., in Step S21, within the fingerprint recognition phase t, a second level signal and a first level signal are alternately loaded to the operating signal lead 20; for example, the second level signal is a high level signal, and the first level signal is a low level signal.

Taking the operating signal loaded to an operating signal lead 20 being a high level signal VGH_G as example, in actual tests, within the fingerprint recognition phase t, there are eight changes in the VGH_G signal, and the change refers to a change from a second level signal to a first level signal; while each change lasts for a relatively short time, a time interval between two adjacent changes is relatively long, and in actual tests, while a duration t1 of a first level signal is 150 µs, a sum of the duration t1 of the first level signal and a duration t2 of an adjacent second level signal is 2 ms.

It is to be noted that, while FIG. 11 only shows a timing of an operating signal VGH_G loaded to one operating signal lead 20, timings of operating signals loaded to other operating signal leads 20 are similar to that of the operating signal VGH_G, and therefore, will not be repeated herein. Hereinafter, description will be made by taking the timing of the operating signal VGH_G as example.

Step S22: Loading fingerprint pulse signals to fingerprint scanning leads within the fingerprint recognition phase, respectively, and a time when a fingerprint pulse signal is loaded to any fingerprint scanning lead and is in an active level state falling within a time period corresponding to a second level signal.

Specifically, referring to FIGS. 3, 7 and 11, within the fingerprint recognition phase t, fingerprint pulse signals are loaded by the fingerprint driving module 300 to respective fingerprint scanning leads 30 sequentially, and a time when a fingerprint pulse signal is loaded to any fingerprint scanning lead 30 and is in an active level state falls within a time period corresponding to a second level signal, such that there is not overlap between the time when the fingerprint pulse signal is loaded to the fingerprint scanning lead and is in the active level state and the time when the operating signal switches between the first level signal and the second level signal, and accordingly, the normal operation of the fingerprint recognition unit 121 will not be affected by jumps in the action of the signal provided by the operating signal lead 20, thereby effectively mitigating the defect of the horizontal stripe noise in the fingerprint image and improving the effects of the fingerprint recognition and the product experience.

Referring to FIGS. 3 and 7, after a fingerprint pulse signal is loaded to a fingerprint scanning lead 30 in each row, the fingerprint recognition units 121 in this row are turned on to perform fingerprint recognition; and electrical signals output from the fingerprint recognition units 121 in each column are read via a fingerprint sensing line S in this column. Once all rows are scanned, the electrical signals output from the fingerprint recognition units 121 in all rows and columns are acquired, thereby realizing fingerprint image detection.

In the second embodiment of the present disclosure, as shown in FIG. 11, within the fingerprint recognition phase t, the operating signal loaded to the operating signal lead 20 jumps (i.e., switches) from a first level signal to a second level signal multiple times, and therefore, the fingerprint recognition phase t includes time periods t2 corresponding to a plurality of second level signals and time periods t1 respectively corresponding to a plurality of first level signals, which are arranged alternately. It is to be understood that the time period t1 corresponding to the first level signal is a time period when the first level signal is being continuously loaded to the operating signal lead 20, and it does not include the switching time from the second level signal to the first level signal and the switching time from the first level signal to the second level signal; and the time period t2 corresponding to the second level signal is a time period when the second level signal is being continuously loaded to the operating signal lead 20, and it does not include the switching time from the second level signal to the first level signal and the switching time from the first level signal to the first level signal.

Referring to FIGS. 7 and 11, in the second embodiment of the present disclosure, for time periods t2 corresponding to at least some second level signals, each of them corresponds to at least one fingerprint scanning lead 30, and a time when a fingerprint pulse signal is loaded to the at least one fingerprint scanning lead 30 and is in an active level state falls within the time period corresponding to the corresponding second level signal. In some embodiments, for time periods t2 corresponding to some second level signals within the fingerprint recognition phase t, each of them corresponds to at least one fingerprint scanning lead 30, and a time when a fingerprint pulse signal is loaded to the at least one fingerprint scanning lead 30 and is in an active level state falls within the time period corresponding to the corresponding second level signal. In some embodiments, for time periods t2 corresponding to all second level signals within the fingerprint recognition phase t, each of them corresponds to at least one fingerprint scanning lead 30, and a time when a fingerprint pulse signal is loaded to the at least one fingerprint scanning lead 30 and is in an active level state falls within the time period corresponding to the corresponding second level signal.

For example, it is assumed that the fingerprint recognition phase t includes time periods t2 corresponding to eight second level signals, and the display panel is provided with 24 fingerprint scanning leads 30. In some embodiments, fingerprint scanning is performed by using time periods t2 corresponding to some (e.g., five) second level signals within the fingerprint recognition phase t; within the time periods t2 corresponding to these (e.g., five) second level signals, fingerprint pulse signals are loaded to a plurality of fingerprint scanning leads 30 sequentially; and each of the time periods t2 corresponding to these (e.g., five) second level signals includes a time when a fingerprint pulse signal is loaded to at least one fingerprint scanning lead 30 and is in an active level state.

In some embodiments, fingerprint scanning is performed by using time periods t2 corresponding to all (i.e., eight) second level signals within the fingerprint recognition phase t; within the time periods t2 corresponding to all the second level signals, fingerprint pulse signals are loaded to a plurality of fingerprint scanning leads 30 sequentially; and each of the time periods t2 corresponding to all the second level signals includes a time when a fingerprint pulse signal is loaded to at least one fingerprint scanning lead 30 and is in an active level state. For example, as shown in FIG. 11, a time period t2 corresponding to each second level signal corresponds to three fingerprint scanning leads 30, and encompasses respective times when the fingerprint pulse signals are loaded to the three fingerprint scanning leads 30 and are in the active level state.

In a case where fingerprint scanning is performed by using time periods t2 corresponding to some (e.g., five) or all (i.e., eight) second level signals, if not all fingerprint scanning leads are scanned within the time periods t2 corresponding to these (e.g., five) second level signals or all (i.e., eight) the second level signals, fingerprint scanning leads 30 that are not scanned may continue to be scanned within time periods t2 corresponding to second level signals in a fingerprint recognition phase of the next frame driving period until the entire fingerprint scanning is completed In a case where fingerprint scanning is performed by using time periods t2 corresponding to some (e.g., five) second level signals within the fingerprint recognition phase t, the time periods t2 corresponding to these second level signals may include time periods t2 corresponding to several (e.g., five) consecutively arranged second level signals or time periods t2 corresponding to several (e.g., five) second level signals arranged at intervals.

In a case where fingerprint scanning is performed by using time periods t2 corresponding to some (e.g., five) or all (i.e., eight) second level signals within the fingerprint recognition phase t, each of the time periods t2 corresponding to these second level signals or all the second level signals may corresponds to one, two, three, four, five or more fingerprint scanning leads 30, or respective time periods t2 corresponding to different second level signals may correspond to the same number of fingerprint scanning leads 30 or different numbers thereof, which may be configured according to actual needs and is not limited in various embodiments of the present disclosure. For example, as shown in FIG. 11, a time period t2 corresponding to each second level signal corresponds to three fingerprint scanning leads 30, and respective time periods t2 corresponding to different second level signals correspond to different fingerprint scanning leads 30.

Hereinafter, an exemplary process of fingerprint scanning and detection in the second embodiment of the present disclosure will be explained in detail with reference to FIGS. 3, 7 and 11.

Description will be made by taking the example in which a fingerprint recognition phase t includes time period t2 corresponding to eight second level signals, the display panel is provided with 24 fingerprint scanning leads 30, fingerprint scanning is performed by using the time period 2 corresponding to all (i.e., eight) second level signals within the fingerprint recognition phase t, and a time period t2 corresponding to each second level signals corresponds to three fingerprint scanning leads 30. As shown in FIG. 11, after the fingerprint recognition phase t starts and a time period t1 (a time period corresponding to a first level signal) elapses, an operating signal VGH_G jumps from a first level signal to a second level signal for the first time, and thereafter, there is no change in the second level signal, which lasts for a time period t2, and within the time period t2 corresponding to the initial second level signal, fingerprint pulse signals are loaded by the fingerprint driving module 300 to a second gate scanning line Gate 21 connected to a corresponding first fingerprint scanning lead 30, a second gate scanning line Gate 22 connected to a corresponding second fingerprint scanning lead 30, and a second gate scanning line Gate 23 connected to a corresponding third fingerprint scanning lead 30, sequentially, and respective times when the fingerprint pulse signal loaded to the three fingerprint scanning leads 30 are in the active level states fall within the time period t2 corresponding to the initial second level signal. Before the end of the time period t2 corresponding to the initial second level signal, the process of fingerprint scanning and detection is suspended. Within a time period t2 corresponding to a succeeding second level signal, fingerprint pulse signals are loaded by the fingerprint driving module 300 to a second gate scanning line Gate 24 connected to a corresponding fourth fingerprint scanning lead 30, a second gate scanning line Gate 25 connected to a corresponding fifth fingerprint scanning lead 30, and a second gate scanning line Gate 26 connected to a corresponding sixth fingerprint scanning lead 30, sequentially. Before the end of the time period t2 corresponding to the second level signal, the process of fingerprint scanning and detection is suspended. The procedure as described above is repeated until the fingerprint scanning leads 30 in all rows are scanned, and eventually, the entire process of fingerprint scanning and detection is completed.

In the second embodiment of the present disclosure, respective timings of the TE signal provided by the display and touch driving device 100 and the operating signal provided to the gate driving circuit and their relative time are fixed and known. Within the fingerprint recognition phase t of the TE signal, by changing the timing of a fingerprint pulse signal, the driving timing of a corresponding fingerprint scanning lead 30 is caused to be located within a time period t2 corresponding to a second level signal loaded to the operating signal lead 20. For example, as shown in FIG. 11, a time period t3 when the fingerprint pulse signals are loaded to the second gate scanning lines Gate 21, 22 and 23 falls within the time period t2 corresponding to the second level signal of the VGH_G signal. In this way, jumps in actions of respective signals loaded to the fingerprint scanning lead 30 and the operating signal lead 20 can be effectively prevented from occurring within the same time period, so as to avoid the interference resulting from the superposition of the action of the signal provided by the operating signal lead 20 and the action of the signal provided by the fingerprint sensing lead 30 and therefore prevent the action of the signal provided by the operating signal lead 20 from affecting the normal operation of the fingerprint recognition unit 121, thereby effectively mitigating the defect of the horizontal stripe noise in the fingerprint image and improving the effects of the fingerprint recognition and the product experience.

Figure 12:
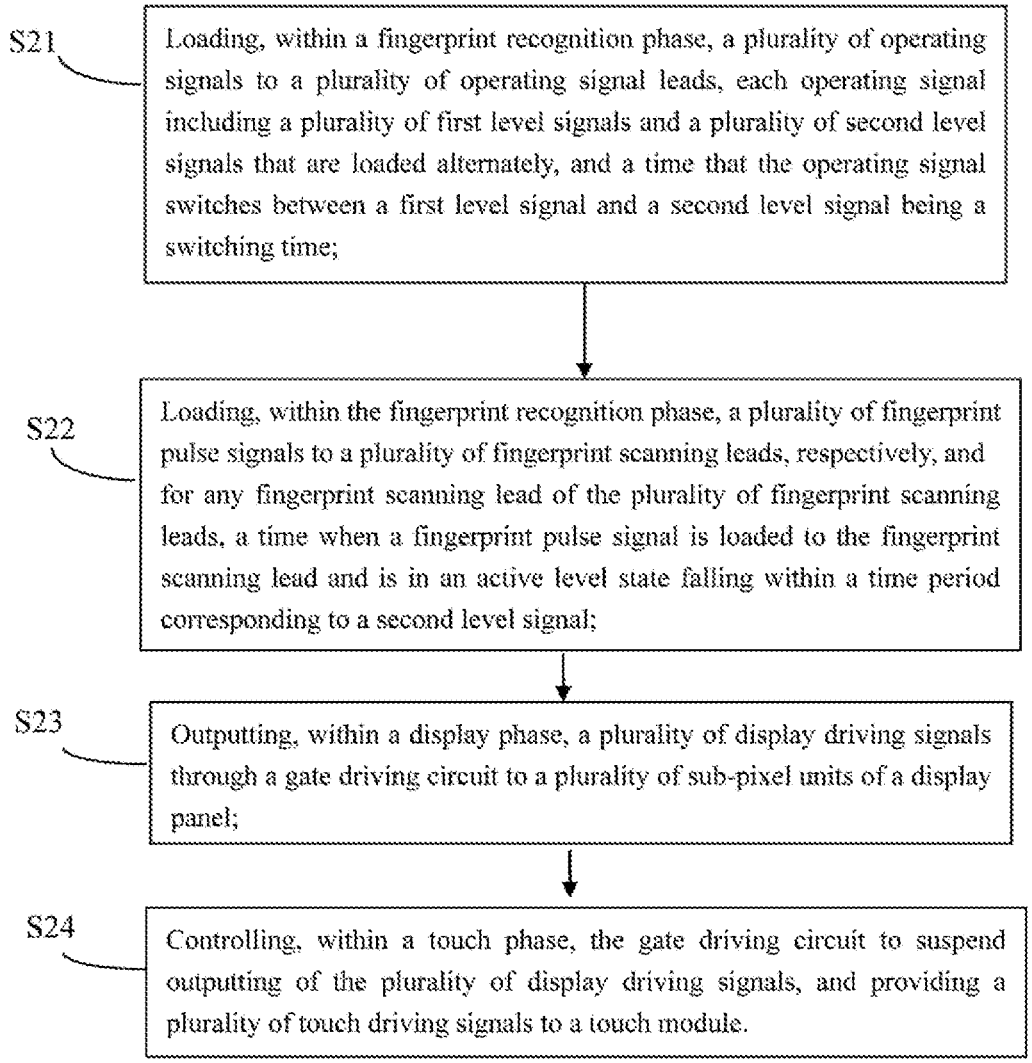
FIG. 12 is a flow chart of another driving method of the display panel provided in the second embodiment of the present disclosure.

In the second embodiment of the present disclosure, the display and touch phase T includes display phases and touch phases. FIG. 12 is a flow chart of another driving method of the display panel provided in the second embodiment of the present disclosure. In addition to Step S21 and Step S22 as described above, the driving method further includes a display driving process and a touch driving process.

Specifically, as shown in FIG. 12, the display driving process includes Step S23, namely, outputting display driving signals via the gate driving circuit to sub-pixel units of the display panel.

Referring to FIGS. 2, 7 and 12, in the display phase, the operating signals are loaded to the operating signal leads 20 to enable the gate driving circuit to output the display driving signals, and the display driving signals (i.e., gate scanning signals) are outputted via the gate driving circuit 200 to the sub-pixel units of the display panel row by row. Specifically, in the display phase, the display driving signals (i.e., gate scanning signals) are outputted via the gate driving circuit 200 to the first gate scanning lines Gate 1 row by row to turn on one row of sub-pixel units P connected to a corresponding first gate scanning line Gate 1 after another. Thereafter, the required data signals are written through the data lines Data in all the columns into the sub-pixel units P that have been turned on row by row, thereby realizing the display function.

As shown in FIG. 12, the touch driving process includes Step S24, namely, controlling the gate driving circuit to suspend outputting of the display driving signals and providing the touch driving signals to the touch module within the touch phase.

As described above, the touch module includes the touch driving lines and the touch sensing lines. Specifically, in Step S24, within the touch phase, the gate driving circuit is controlled to suspend the outputting of the display driving signals, the touch driving signals are provided to the touch module and the touching sensing signals are read through the touch sensing lines, thereby realizing the touch detection.

In some embodiments, the display panel is driven under the Long-H mode. As shown in FIG. 4, the display phase T includes a plurality of sub-display phases T1, and a touch phase T2 is situated between every two adjacent sub-display phases T1. In this case, within the current sub-display phase T1, the display driving signals are provided to one or more rows of sub-pixel units; once the current sub-display phase T1 ends, the current touch phase T2 starts, and within the current touch phase T2, the touch driving signals are provided to one or more touch driving lines in one or more rows; once the current touch phase T2 ends, the next display phase T1 starts; within the next display phase T1, the display driving signals continue to be provided to the remaining one or more rows of sub-pixel units; and the foregoing procedure is repeated until the display driving process and the touch driving process are completed.

In some embodiments, the display panel is driven under the Long-V mode. The display phase T includes a plurality of sub-display phases T1, and a touch phase T2 follows the last display phase T1.

In addition, for detailed description of the second embodiment of the present disclosure, reference may be made to the foregoing description relating to the display panel, which will not be repeated herein.

Third Embodiment

Figure 13:
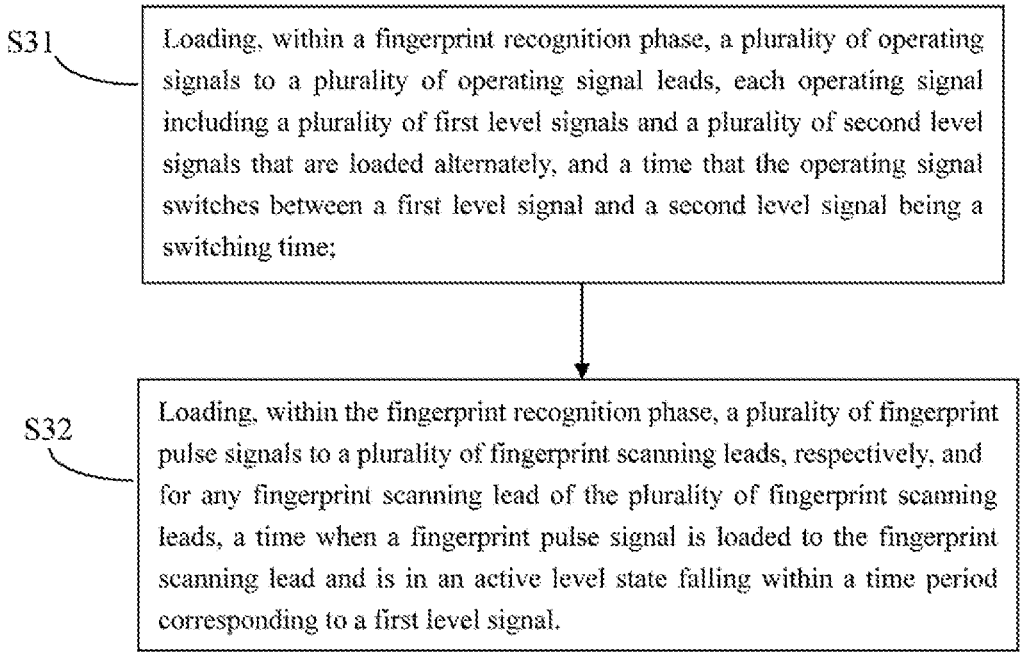
FIG. 13 is a flow chart of a driving method of a display panel provided in a third embodiment of the present disclosure.
Figure 14:
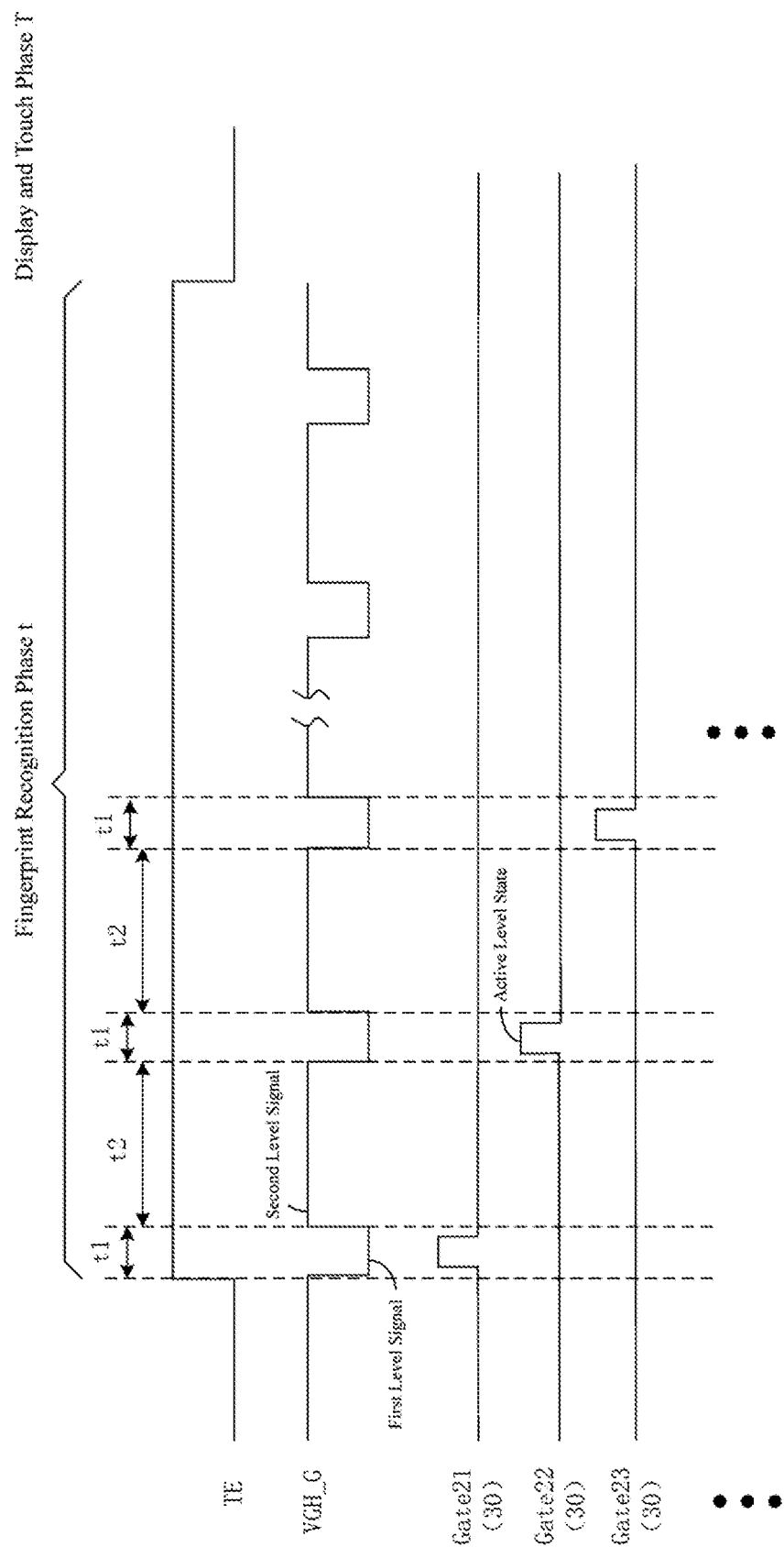
FIG. 14 is a diagram showing a driving timing of the driving method shown in FIG. 13.

In order to effectively solve the problem of the horizontal stripe noise at the fixed interval in the fingerprint image as described above, a third embodiment of the present disclosure provides a driving method of a display panel, wherein the display panel is the same display panel as described above; an operating process of the display panel includes a plurality of frame driving periods, each of which includes fingerprint recognition phases t and display and touch phases T; each display and touch phase T includes display phases and touch phases; and in the operating process of the display panel, the fingerprint recognition phases t alternate with the display and touch phases T. FIG. 13 is a flow chart of the driving method of the display panel provided in the third embodiment of the present disclosure; and FIG. 14 is a diagram showing a driving timing of the driving method shown in FIG. 13. As shown in FIGS. 13 and 14, the driving method includes the following steps:

Step S31: Loading operating signals to operating signal leads within a fingerprint recognition phase; each operating signal including first level signals and second level signals that are loaded alternately; and a time corresponding to the working signal's switching between a first level signal and a second level signal being a switching time.

For detailed description of Step S31, reference may be made to the description relating to Step S21 in the second embodiment, which will not be repeated herein.

Step S32: Loading fingerprint pulse signals to fingerprint scanning leads within the fingerprint recognition phase, respectively, and a time when a fingerprint pulse signal is loaded to any fingerprint scanning lead and is in an active level state falling within a time period corresponding to a first level signal.

It is to be understood that the third embodiment of the present disclosure differs from the second embodiment merely in that, in the third embodiment, within the fingerprint recognition phase, a time when a fingerprint pulse signal is loaded to any fingerprint scanning lead and is in an active level state falls within a time period corresponding to a first level signal. Therefore, there is no overlap between the time when the fingerprint pulse signal is loaded to the fingerprint scanning lead and is in the active level state and the time when the working signal switches between the first level signal and the second level signal, and accordingly, the normal operation of the fingerprint recognition unit 121 will not be affected by jumps in the action of the signal provided by the operating signal lead 20, thereby effectively mitigating the defect of the horizontal stripe noise in the fingerprint image and improving the effects of the fingerprint recognition and the product experience.

It is to be noted that, in practical applications, the duration of a fingerprint pulse (i.e., a portion of a fingerprint pulse signal that is in an active level state) is typically between 10 µs to 40 µs, and a time period corresponding to a first level signal is 150 µs; therefore, the time period corresponding to the first level signal may correspond to a plurality of fingerprint pulses, that is, the driving is realized by a plurality of fingerprint scanning leads. FIG. 14 only schematically shows that a time period corresponding to a first level signal corresponds to one fingerprint pulse, which is only for illustrative purposes, but is not intended to limit the technical solutions of the present disclosure.

For detailed description of Step S32, reference may be made to the description relating to Step S22, and Step S32 can be achieved simply by replacing "a time period corresponding to a second level signal" in Step S22 with "a time period corresponding to a first level signal", which will not be repeated herein. Further, for other description relating to the driving method provided in the third embodiment of the present disclosure, reference may be made to the relevant description in the second embodiment, which will not be repeated herein.

Fourth Embodiment

Figure 16:
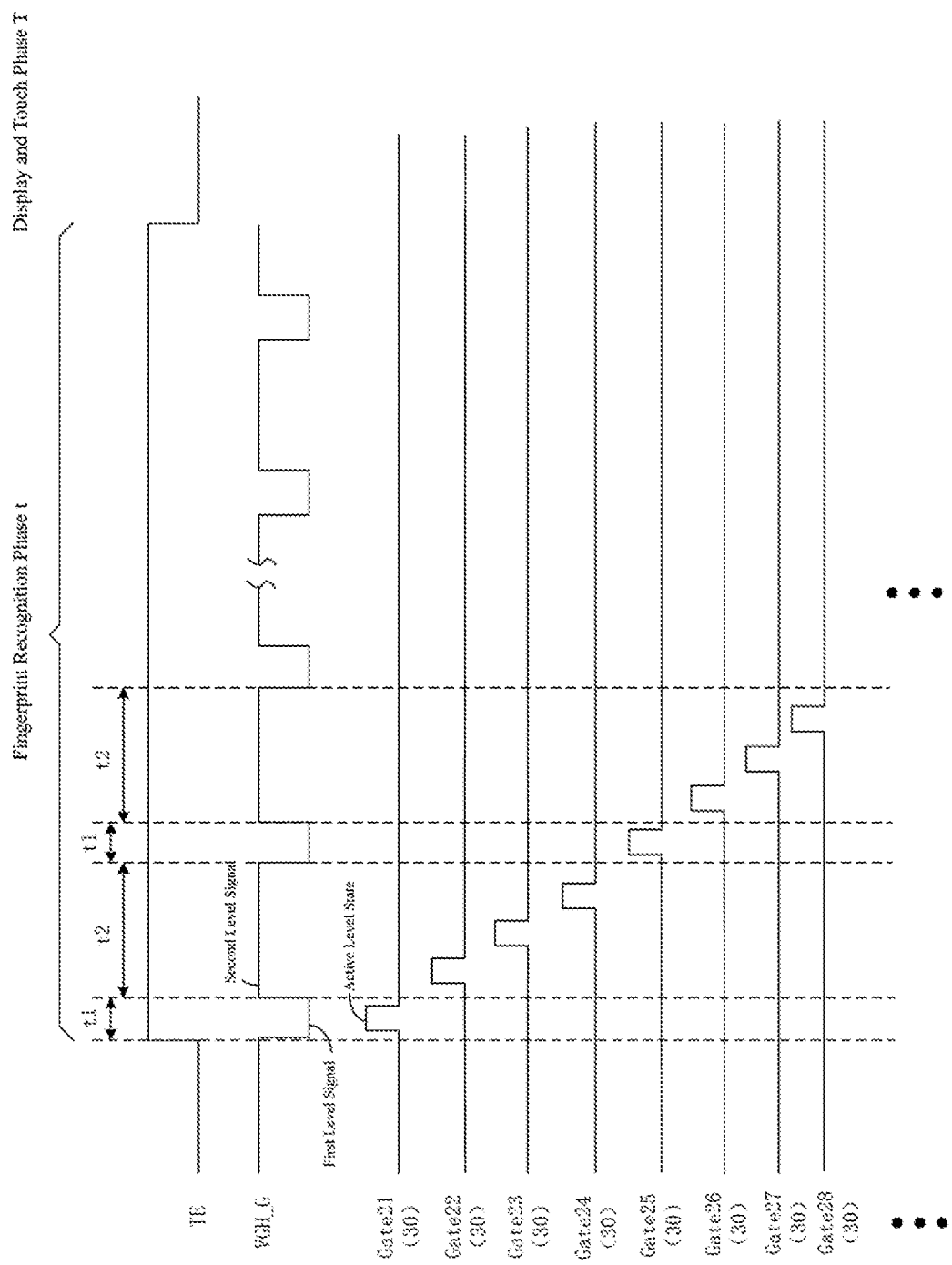
FIG. 16 is a diagram showing a driving timing of the driving method shown in FIG. 15.

In order to effectively solve the problem of the horizontal stripe noise at the fixed interval in the fingerprint image as described above, a fourth embodiment of the present disclosure provides a driving method of a display panel, wherein the display panel is the same display panel as described above; an operating process of the display panel includes a plurality of frame driving periods, each of which includes fingerprint recognition phases t and display and touch phases T; each display and touch phase T includes display phases and touch phases; and in the operating process of the display panel, the fingerprint recognition phases t alternate with the display and touch phases T. FIG. 15 is a flow chart of the driving method of the display panel provided in the fourth embodiment of the present disclosure; FIG. 16 is a diagram showing a driving timing of the driving method shown in FIG. 15. As shown in FIGS. 15 and 16, the driving method includes the following steps:

Step 41: Loading working signals to operating signal leads within a fingerprint recognition phase; each operating signal including first level signals and second level signals that are loaded alternately; and a time that corresponds to the operating signal's switching between a first level signal and a second level signal being a switching time.

For detailed description of Step S41, reference may be made to the description relating to Step S21 in the second embodiment, which will not be repeated herein.

Step S42: Loading fingerprint pulse signals to fingerprint scanning leads within the fingerprint recognition phase, respectively, wherein for some fingerprint scanning leads, a time when a fingerprint pulse signal is loaded to each fingerprint scanning lead and is in an active level state falls within a time period corresponding to a first level signal, and for other fingerprint scanning leads, a time when a fingerprint pulse signal is loaded to each fingerprint scanning lead and is in an active level state falls within a time period corresponding to a second level signal.

It is to be understood that the fourth embodiment differs from the second and third embodiments merely in that, in the fourth embodiment, within the fingerprint recognition phase, for some fingerprint scanning leads, a time when a fingerprint pulse signal is loaded to each fingerprint scanning lead and is in an active level state falls within a time period corresponding to a first level signal, and for other fingerprint scanning leads, a time when a fingerprint pulse signal is loaded to each fingerprint scanning lead and is in an active level state falls within a time period corresponding to a second level signal. Therefore, there is no overlap between the time when the fingerprint pulse signal is loaded to the fingerprint scanning lead and is in the active level state and the time when the working signal switches between the first level signal and the second level signal, and accordingly, the normal operation of the fingerprint recognition unit 121 will not be affected by jumps in the action of the signal provided by the operating signal lead 20, thereby effectively mitigating the defect of the horizontal stripe noise in the fingerprint image and improving the effects of the fingerprint recognition and the product experience.

It is to be noted that, in practical applications, there is a certain time interval, which typically ranges from 5 µs to 20 µs, between two fingerprint pulses respectively loaded to two adjacent fingerprint scanning leads, and the switching time necessary for the operating signal to switch from a first level signal to a second level signal or vice versa is typically less than 1 µs; and therefore, as long as it is ensured that a switching time for the operating signal falls within a time interval between every two adjacent fingerprint pulses, some fingerprint pulses can be made to fall within time periods corresponding to the first level signals while others can be made to fall within time periods corresponding to the second level signals.

For detailed description of Step S42 as well as other description relating to the driving method provided in the fourth embodiment of the present disclosure, reference may be made to the relevant description in the second and third embodiments, which will not be repeated herein.

Fifth Embodiment

Figure 17:
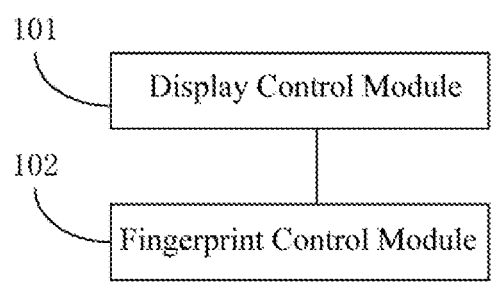
FIG. 17 is a block diagram showing a composition of a driving device for a display panel provided in a fifth embodiment of the present disclosure.

In order to effectively solve the problem of the horizontal stripe noise at the fixed interval in the fingerprint image as described above, a fifth embodiment of the present disclosure provides a driving method of a display panel, wherein the display panel is the same display panel as described above; an operating process of the display panel includes a plurality of frame driving periods, each of which includes fingerprint recognition phases, and display and touch phases; each display and touch phase T includes display phases and touch phases; and in the operating process of the display panel, the fingerprint recognition phases alternate with the display and touch phases. FIG. 17 is a block diagram showing a structure of a driving device for the display panel provided in the fifth embodiment of the present disclosure. As shown in FIG. 17, the driving device includes a display control module 101 and a fingerprint control module 102.

The display control module 101 is configured to load operating signals to operating signal leads within a fingerprint recognition phase, each operating signal includes first level signals and second level signals that are loaded alternately, and a time that corresponds to the operating signal's switching between a first level signal and a second level signal is a switching time; the fingerprint control module 102 is configured to load fingerprint pulse signals to fingerprint scanning leads within the fingerprint recognition phase, respectively, and for any fingerprint scanning lead of the plurality of fingerprint scanning leads, a time when a fingerprint pulse signal is loaded to the fingerprint scanning lead and is in an active level state does not overlap with a switching time.

In some embodiments, for any fingerprint scanning lead, a time when a fingerprint pulse signal is loaded to the fingerprint scanning lead and is in an active level state falls within a time period corresponding to a second level signal, such that the time when the fingerprint pulse signal is loaded to the fingerprint scanning lead and is in the active level state does not overlap with a switching time.

In some embodiments, for any fingerprint scanning lead, a time when a fingerprint pulse signal is loaded to the fingerprint scanning lead and is in an active level state falls within a time period corresponding to a first level signal, such that the time when the fingerprint pulse signal is loaded to the fingerprint scanning lead and is in the active level state does not overlap with a switching time.

In some embodiments, for some fingerprint scanning leads, a time when a fingerprint pulse signal is loaded to each fingerprint scanning lead and is in an active level state falls within a time period corresponding to a first level signal, and for other fingerprint scanning leads, a time when a fingerprint pulse signal is loaded to each fingerprint scanning lead and is in an active level state falls within a time period corresponding to a second level signal, such that the time when the fingerprint pulse signal is loaded to the fingerprint scanning lead and is in the active level state does not overlap with a switching time.

In some embodiments, for time periods corresponding to at least some second level signals, a time period corresponding to each of the at least some second level signals corresponds to at least one fingerprint scanning lead, and a time when a fingerprint pulse signal is loaded to the at least one fingerprint scanning lead and is in an active level state falls within the time period corresponding to the second signal level.

In some embodiments, a display and touch phase includes display phases and touch phases; the display control module 101 is further configured to output display driving signals through a gate driving circuit to sub-pixel units of the display panel, within a display phase; and control the gate driving circuit to suspend outputting of the display driving signals, and provide touch driving signals to a touch module, within a touch phase.

In some embodiments, the display phase includes a plurality of sub-display phases, and a touch phase is situated between every two adjacent sub-display phases. In some embodiments, the display phase includes a plurality of sub-display phases, and a touch phase follows the last sub-display phase.

In the fifth embodiment of the present disclosure, the driving device is the display and touch driving device 100 as shown in FIG. 7, and may include a TDDI chip.

Further, the driving device provided in the fifth embodiment of the present disclosure is configured to implement the driving method provided in any embodiment as described above, and for detailed description relating thereto, reference may be made to the description of the foregoing embodiments, which will not be repeated herein.

Sixth Embodiment

In order to effectively solve the problem of the horizontal stripe noise at the fixed interval in the fingerprint image as described above, a sixth embodiment of the present disclosure provides a display apparatus, including the display panel and the driving device provided in the foregoing embodiments. For detailed description of the display panel and the driving device, reference may be made to the description of the foregoing embodiments, which will not be repeated herein.

The display apparatus may be any other product or component having display function such as a television, a monitor, a digital photo frame, a mobile phone, and a tablet computer.

It is to be understood that the foregoing embodiments are merely exemplary embodiments for the purpose of illustrating the principle of the present disclosure, and the present disclosure is not limited thereto. Various modifications and improvements can be made by a person skilled in the art without departing from the spirit and essence of the present disclosure. Accordingly, all of the modifications and improvements also fall into the protection scope of the present disclosure.

The invention claimed is:

1. A driving method of a display panel, wherein the display panel comprises a fingerprint recognition module, a gate driving circuit for display driving, a plurality of operating signal leads configured to provide a plurality of operating signals to the gate driving circuit and a plurality of fingerprint scanning leads configured to transmit a plurality of fingerprint pulse signals to the fingerprint recognition module; an operating process of the display panel comprises a plurality of fingerprint recognition phases and a plurality of display phases which alternate with each other; and the driving method comprises:

loading, within the fingerprint recognition phase, the plurality of operating signals to the plurality of operating signal leads and the plurality of fingerprint pulse signals to the plurality of fingerprint scanning leads, respectively;

each operating signal of the plurality of operating signals comprising a plurality of first level signals and a plurality of second level signals that are loaded alternately, and a time that the operating signal switches between the first level signal and the second level signal being a switching time; and for any fingerprint scanning lead of the plurality of fingerprint scanning leads, a time when the fingerprint pulse signal is loaded to the fingerprint scanning lead and is in an active level state not overlapping with a switching time.

2. The driving method according to claim 1, wherein for any fingerprint scanning lead of the plurality of fingerprint scanning leads, a time when the fingerprint pulse signal is loaded to the fingerprint scanning lead and is in an active level state falls within a time period corresponding to the second level signal.

3. The driving method according to claim 1, wherein for any fingerprint scanning lead of the plurality of fingerprint scanning leads, a time when the fingerprint pulse signal is loaded to the fingerprint scanning lead and is in an active level state falls within a time period corresponding to the first level signal.

4. The driving method according to claim 1, wherein among some fingerprint scanning leads of the plurality of fingerprint scanning leads, a time when the fingerprint pulse signal is loaded to each fingerprint scanning lead of the some fingerprint scanning leads and is in an active level state falls within a time period corresponding to the first level signal; and among other fingerprint scanning leads of the plurality of fingerprint scanning leads, a time when the fingerprint pulse signal is loaded to each fingerprint scanning lead of the other fingerprint scanning leads and is in an active level state falls within a time period corresponding to the second level signal.

5. The driving method according to claim 2, wherein among respective time periods corresponding to at least some second level signals of the plurality of second level signals, a time period corresponding to any second level signal corresponds to a plurality of fingerprint scanning leads, and respective times when fingerprint pulse signals are loaded to the plurality of fingerprint scanning leads and are in active level states fall within the time period corresponding to the second level signal to which the plurality of fingerprint scanning leads correspond.

6. The driving method according to claim 1, wherein the display panel further comprises a touch module and a plurality of sub-pixel units, the operating process of the display panel further includes a plurality of touch phases, and the driving method further comprises:

outputting a plurality of display driving signals through the gate driving circuit to the plurality of sub-pixel units of the display panel, within the display phase; and controlling the gate driving circuit to suspend outputting of the plurality of display driving signals, and providing a plurality of touch driving signals to the touch module, within the touch phase.

7. The driving method according to claim 6, wherein the display phase comprises a plurality of sub-display phases and the touch phase is between every two adjacent sub-display phases.

8. The driving method according to claim 6, wherein the display phase comprises a plurality of sub-display phases and the touch phase follows a last sub-display phase of the plurality of sub-display phases.

9. A driving device for a display panel, wherein the display panel comprises a fingerprint recognition module, a gate driving circuit for display driving, a plurality of operating signal leads configured to provide a plurality of operating signals to the gate driving circuit and a plurality of fingerprint scanning leads configured to transmit a plurality of fingerprint pulse signals to the fingerprint recognition module; an operating process of the display panel comprises a plurality of fingerprint recognition phases and a plurality of display phases which alternate with each other; and the driving device comprises:

a display control module configured to load, within the fingerprint recognition phase, the plurality of operating signals to the plurality of operating signal leads, each operating signal of the plurality of operating signals comprising a plurality of first level signals and a plurality of second level signals that are loaded alternately, and a time that the operating signal switches between the first level signal and the second level signal being a switching time; and a fingerprint control module configured to load, within the fingerprint recognition phase, the plurality of fingerprint pulse signals to the plurality of fingerprint scanning leads, respectively, and for any fingerprint scanning lead of the plurality of fingerprint scanning leads, a time when the fingerprint pulse signal is loaded to the fingerprint scanning lead and is in an active level state not overlapping with the switching time.

10. The driving device according to claim 9, wherein for any fingerprint scanning lead of the plurality of fingerprint scanning leads, a time when the fingerprint pulse signal is loaded to the fingerprint scanning lead and is in an active level state falls within a time period corresponding to the second level signal.

11. The driving device according to claim 9, wherein for any fingerprint scanning lead of the plurality of fingerprint scanning leads, a time when the fingerprint pulse signal is loaded to the fingerprint scanning lead and is in an active level state falls within a time period corresponding to the first level signal.

12. The driving device according to claim 9, wherein among some fingerprint scanning leads of the plurality of fingerprint scanning leads, a time when the fingerprint pulse signal is loaded to each fingerprint scanning lead of the some fingerprint scanning leads and is in an active level state falls within a time period corresponding to the first level signal; and among other fingerprint scanning leads of the plurality of fingerprint scanning leads, a time when the fingerprint pulse signal is loaded to each fingerprint scanning lead of the other fingerprint scanning leads and is in an active level state falls within a time period corresponding to the second level signal.

13. The driving device according to claim 10, wherein among respective time periods corresponding to at least some second level signals of the plurality of second level signals, a time period corresponding to any second level signal corresponds to a plurality of fingerprint scanning leads, and respective times when fingerprint pulse signals are loaded to the plurality of fingerprint scanning leads and are in active level states fall within the time period corresponding to the second level signal to which the plurality of fingerprint scanning leads correspond.

14. The driving device according to claim 9, wherein the driving device comprises a touch and display driver integration chip.

15. A display apparatus, comprising a display panel and the driving device according to claim 9.

16. The driving device according to claim 10, wherein the driving device comprises a touch and display driver integration chip.

17. The driving device according to claim 11, wherein the driving device comprises a touch and display driver integration chip.

18. The driving device according to claim 12, wherein the driving device comprises a touch and display driver integration chip.

19. The driving device according to claim 13, wherein the driving device comprises a touch and display driver integration chip.

20. The display apparatus according to claim 15, wherein for any fingerprint scanning lead of the plurality of fingerprint scanning leads, a time when the fingerprint pulse signal is loaded to the fingerprint scanning lead and is in an active level state falls within a time period corresponding to the second level signal.

* * * * *